United States Patent
Yoshida

(10) Patent No.: US 7,649,451 B2
(45) Date of Patent: Jan. 19, 2010

(54) DATA PROCESSING DEVICE

(75) Inventor: Yasunari Yoshida, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 318 days.

(21) Appl. No.: 11/640,865

(22) Filed: Dec. 19, 2006

(65) Prior Publication Data

US 2007/0143504 A1    Jun. 21, 2007

(30) Foreign Application Priority Data

Dec. 19, 2005  (JP) ............................. P2005-365598

(51) Int. Cl.
G08B 25/00 (2006.01)
G06F 3/12 (2006.01)
G06F 3/00 (2006.01)

(52) U.S. Cl. ...................... 340/525; 340/3.3; 700/83; 709/223; 719/310; 358/1.1; 358/1.15

(58) Field of Classification Search .................. 340/525
See application file for complete search history.

(56) References Cited

U.S. PATENT DOCUMENTS 6,134,020 A * 10/2000 Masumoto et al. ......... 358/1.16
6,426,798 B1 * 7/2002 Yeung ....................... 358/1.13
6,856,413 B1 * 2/2005 Roosen et al. .............. 358/1.15
2003/0061322 A1 * 3/2003 Igarashi et al. .............. 709/223
2003/0112456 A1 * 6/2003 Tomita et al. ............... 358/1.13

FOREIGN PATENT DOCUMENTS

JP     2002-287924    10/2002
JP     2004-38296     2/2004

* cited by examiner

Primary Examiner—Donnie L Crosland
(74) Attorney, Agent, or Firm—Baker Botts, LLP.

(57) ABSTRACT

The data processing device includes an identification information displaying controller, a selecting controller, and a recording controller. The identification information displaying controller displays a plurality of identification information that is read from a storage medium and is indicative of respective ones of a plurality of different operating conditions. The selecting controller selects at least one of the plurality of identification information from the plurality of identification information. The recording controller records the at least one of the plurality of identification information, allowing a user to use at least one of the plurality of different operating conditions that corresponds to the at least one of the plurality of identification information.

18 Claims, 22 Drawing Sheets

DATA PROCESSING DEVICE

CROSS REFERENCE TO RELATED APPLICATIONS

This application claims priority from Japanese Patent Application No. 2005-365598 filed Dec. 19, 2005. The entire content of the priority application is incorporated herein by reference.

TECHNICAL FIELD

The disclosure relates to a process technology for registering a peripheral device, such as a printer, scanner, or multi-function device, on a data processing device as a virtual object in which a plurality of different operating conditions are set.

BACKGROUND

When printing text data or image data on recording paper using a printer connected to a personal computer, a printer driver must be first installed on the personal computer for controlling the printer. The printer driver is generally distributed to the user in a form stored on a CD-ROM or other storage medium, or in a form already incorporated in the operating system of the personal computer.

Conventionally, printer drivers have been installed by executing an installation program, often called an installer. For example, when installing a printer driver from a CD-ROM, the CD-ROM is first inserted into a media-reading device provided in the personal computer. In this case, the installer is started automatically. The installer displays a window on the display of the personal computer having an install wizard format. Through this window, the user specifies the directory (folder) for installing the driver and performs other settings. After inputting an install command, the printer driver stored on the CD-ROM is installed in the specified directory.

When the printer driver is installed on the personal computer, a virtual printer is created on the personal computer and entered in a registry managed by the operating system. Predetermined printing conditions for the virtual printer are set as default values. The user selects a virtual printer when transmitting printer data from the personal computer to the printer to perform a printing operation. At this time, the user can manually set each of the plurality of settings constituting the printing conditions using a mouse or other input device in the Properties window of the virtual printer. After completing the settings of the printing conditions and inputting a print command, the printer executes the printing operation according to the set printing conditions.

However, there has been a trend in recent years to increase the number of settings in the printing conditions as the printers are being provided with more functions. With this increase in settings, more operations and more time are required for setting the printing conditions. This is particularly inconvenient to users wishing to change settings on the printer as the user must switch through numerous screens and often cannot easily reach the screen needed to perform the desired setting.

Japanese unexamined patent application publications Nos. 2004-38296 and 2002-287924 propose a technology for registering a plurality of virtual printers having different default printing conditions on a personal computer, and enabling the user to execute a printing process according to desired printing conditions simply by selecting the virtual printer conforming to the desired printing conditions. In this way, desired printing results can be easily obtained without setting each of a plurality of printing conditions to the desired values

SUMMARY

However, the data processing device disclosed in Japanese unexamined patent application publication No. 2004-38296 registers virtual printers having different printing conditions on the personal computer by having a network or office automation equipment administrator install a plurality of printer drivers preset with standard printing conditions on the personal computer, without regard for the user's wishes. This sometimes results in registering virtual printers with settings that are unnecessary for some users, and not registering virtual printers that are required by certain users. Further, the printer system disclosed in Japanese unexamined patent application publication No. 2002-287924 has a drivers adding function that enables the user to register new virtual printers on the personal computer by installing a driver with printing conditions set in a Properties window as the default settings. However, this system requires the same complex operations for setting and registering printing conditions as those described above in the conventional problems and is, therefore, not particularly convenient for the user.

In view of the foregoing, it is an object of the invention to provide a storage medium storing a program and a method registering virtual objects capable of providing a more user-friendly process for registering a plurality of virtual objects with different operating conditions on a personal computer, and capable of registering virtual objects desired by the user.

In order to attain the above and other objects, the invention provides a data processing device. The data processing device is capable of registering a prescribed peripheral device. The data processing device includes an identification information displaying controller, a selecting controller, and a recording controller. The identification information displaying controller displays a plurality of identification information that is read from a storage medium and is indicative of respective ones of a plurality of different operating conditions. The selecting controller selects at least one of the plurality of identification information from the plurality of identification information. The recording controller records the at least one of the plurality of identification information, allowing a user to use at least one of the plurality of different operating conditions that corresponds to the at least one of the plurality of identification information.

According to another aspects, the invention provides a method for registering a prescribed peripheral device on a data processing device. The method includes displaying, on a display device, a plurality of identification information that is read from a storage medium and is indicative of respective ones of a plurality of different operating conditions, selecting at least one of the plurality of identification information from the plurality of identification information, and recording the at least one of the plurality of identification information in the data processing device, allowing a user to use at least one of the plurality of different operating conditions that corresponds to the at least one of the plurality of identification information.

According to still another aspect, the invention provides a computer program product recorded on a computer readable recording medium, executable by a computer of a data processing device. The computer program registers a prescribed peripheral device on a data processing device. The computer program includes instructions for displaying on a display device, a plurality of identification information that is read from a storage medium and is indicative of respective ones of a plurality of different operating conditions, instructions for selecting at least one of the plurality of identification information from the plurality of identification information, and instructions for recording the at least one of the plurality of identification information in the data processing device, allowing a user to use at least one of the plurality of different operating conditions that corresponds to the at least one of the plurality of identification information.

BRIEF DESCRIPTION OF THE DRAWINGS

Illustrative aspects in accordance with invention will be described in detail with reference to the following figures wherein.

DETAILED DESCRIPTION

Figure 1:
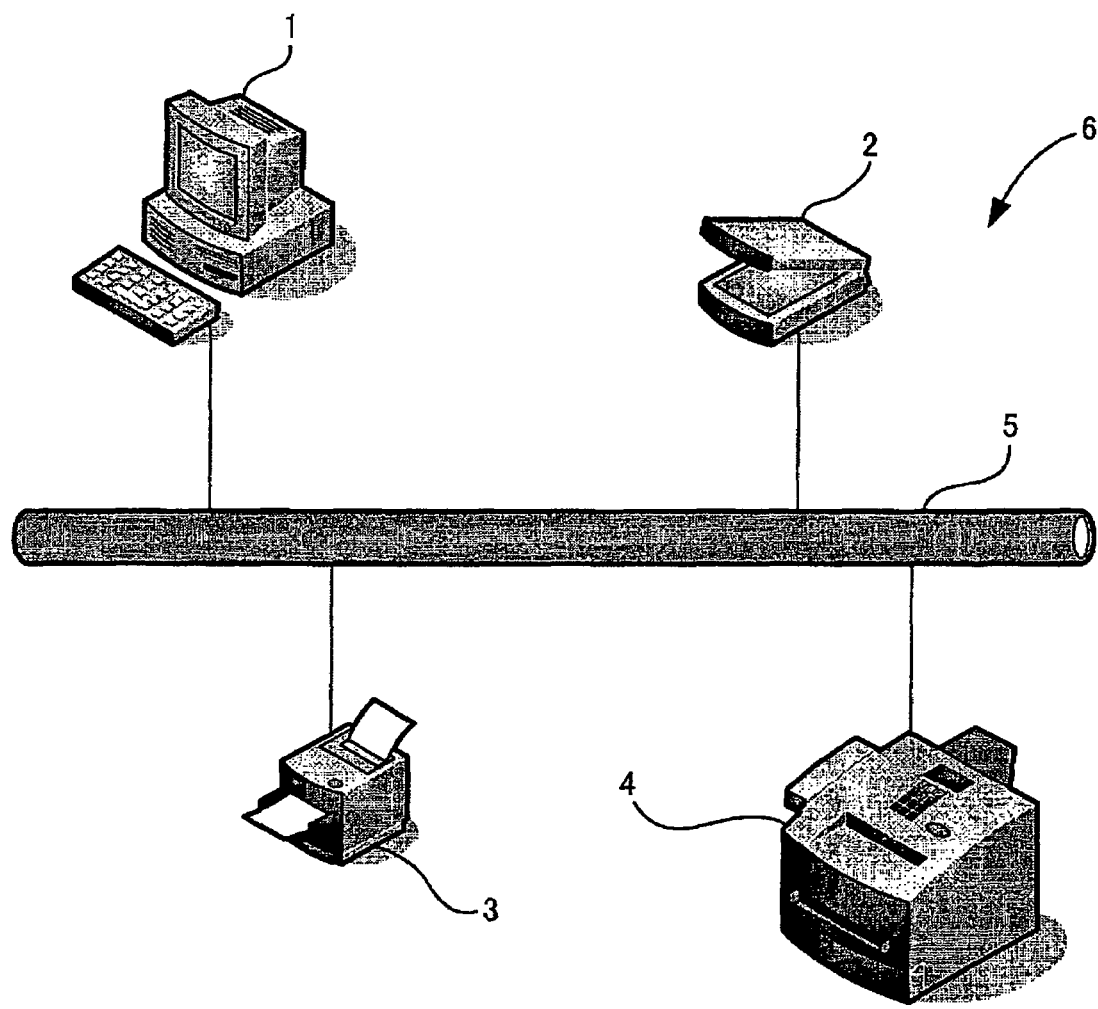
FIG. 1 is an explanatory diagram showing an overview of a network environment in which a personal computer is connected to a scanner, printer, and multifunction device.

A data processing device and a program and method for registering virtual objects according to some aspects of the invention will be described while referring to the accompanying drawings wherein like parts and components are designated by the same reference numerals to avoid duplicating description.

Figure 3:
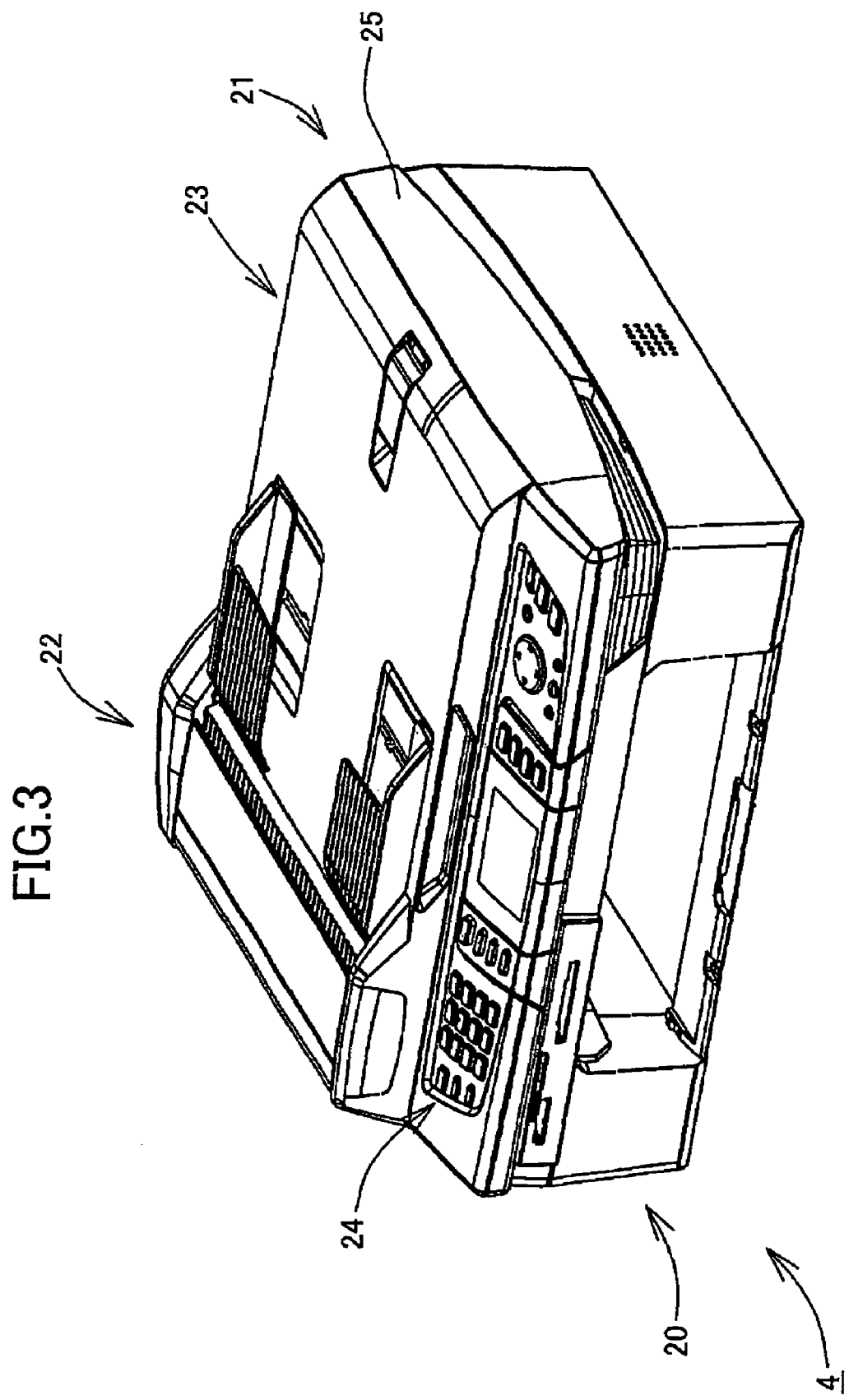
FIG. 3 is a perspective view showing the external structure of the multifunction device.

A personal computer 1 serves as the data processing device of this example. As shown in FIG. 1, a network system 6 includes the personal computer 1 that is connected to and capable of communicating with a scanner 2, a printer 3, and a multifunction device 4 via a LAN or other network 5. A method of installing a printer driver on the personal computer 1 in this network system 6 for controlling a printer unit 20 (see FIG. 3) of the printer 3 or multifunction device 4 is described below. FIG. 1 is an explanatory diagram illustrating this overall network environment in which the personal computer 1 is connected to the scanner 2, printer 3, and multifunction device 4. However, the some aspects of the invention may also be applied to a personal computer 1 connected directly to the scanner 2, printer 3, and multifunction device 4 through serial cables or USB cables rather than the network 5. While this example covers an process of installing a printer driver on the personal computer 1, it should be apparent that the invention may also be applied to a process for installing a scanner driver on the personal computer 1 in order to control operations of the scanner 2.

Figure 2:
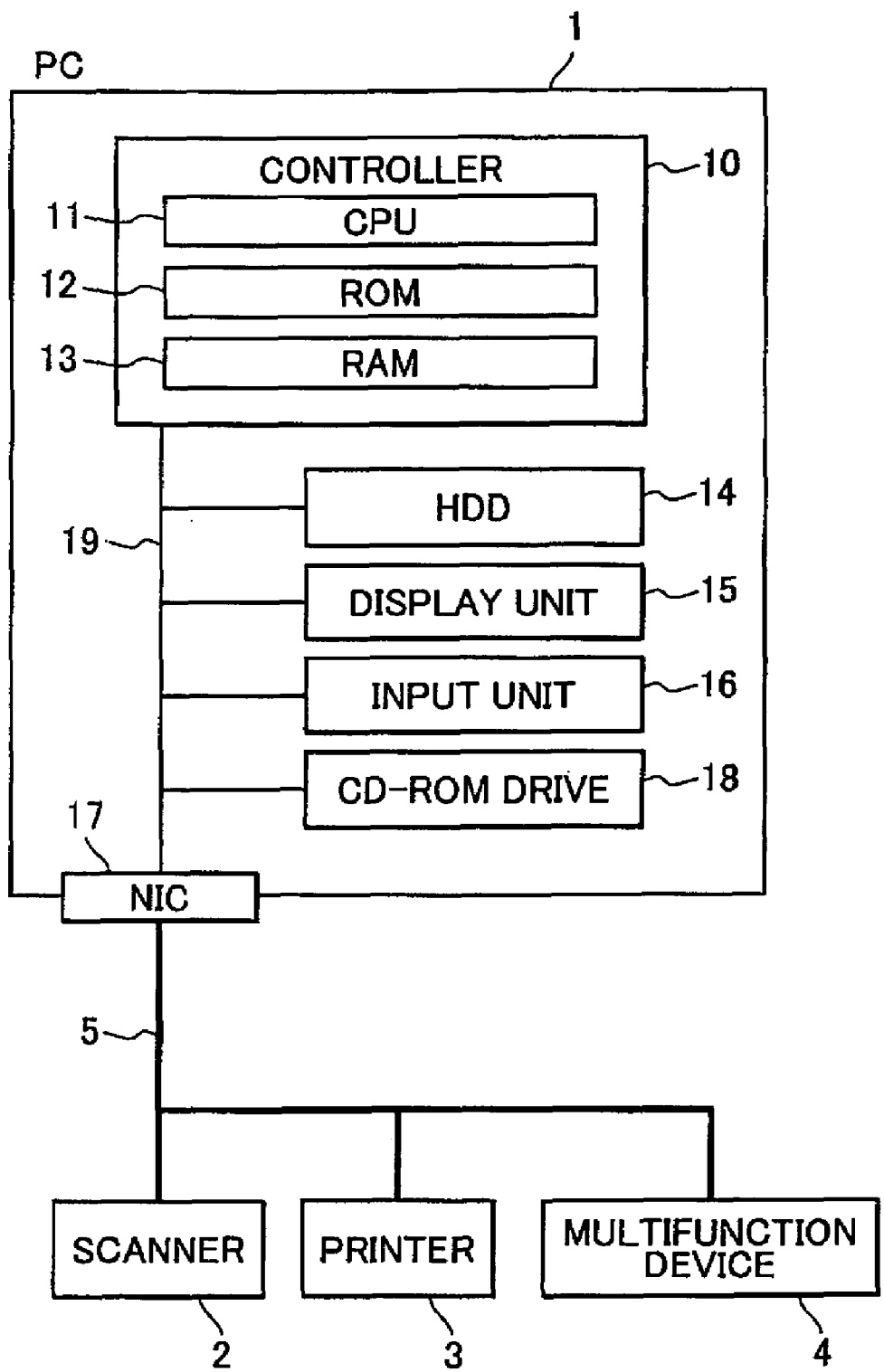
FIG. 2 is a block diagram showing the general structure of the personal computer.

Next, the overall structure of the personal computer 1 constituting the network system 6 of FIG. 1 will be described with reference to FIG. 2. FIG. 2 is a block diagram illustrating the general structure of the personal computer 1. As shown in FIG. 2, the personal computer 1 includes a controller 10, a hard disk drive 14 for storing various programs and data, a display unit 15, an input unit 16, a CD-ROM drive 18 for reading data stored on a CD-ROM, and a network interface card (NIC) 17 such as a LAN adapter for connecting the personal computer 1 to the network 5. All of these components are connected to each other and are capable of communicating with each other via an internal bus 19. Here, the personal computer 1 is a common computer capable of performing general computations and storage processes and does not employ any special hardware. Hence, the personal computer 1 is not limited to the above-described structure. Further, the personal computer 1 is used as an example, but the data processing device may also be a terminal device, such as a personal digital assistant (PDA) or a cellular telephone having a built-in computer. In such cases, it is possible to create an environment in which the terminal device can exchange data with an external hard disk drive or other external storage device or with an external CD-ROM drive, without equipping the terminal device with the CD-ROM drive 18 or hard disk drive 14.

The hard disk drive 14 is integrally configured of a high-capacity disk and a reading device. The hard disk drive 14 stores the operating system (OS) of the personal computer 1 and various data. In this example, the Windows (registered trademark) operating system has been installed on the personal computer 1, but the present invention may be applied to a personal computer running another operating system.

The hard disk drive 14 includes a system folder for storing various system files required for operations performed by the OS. In addition to programs for the operating system itself, the system folder also stores settings for application programs; driver programs for operating such hardware as the CD-ROM drive 18, a liquid crystal display, and a keyboard provided with the personal computer 1; settings for user profiles; utility programs for modifying settings of the network system 6 including peripheral devices; and library files storing advanced features used by application programs. A printer driver 71 (see FIG. 4) installed from a CD-ROM 70 (see FIG. 4), as will be described later, is also stored in the system folder of the hard disk drive 14.

The controller 10 controls all components in the personal computer 1. The controller 10 is configured of a computer having such electronic devices as a CPU (central processing unit) 11, a ROM (read only memory) 12, and a RAM (random access memory) 13. The controller 10 is commonly referred to as the motherboard of the personal computer 1 and allows the OS to operate on the personal computer 1. In the OS environment, the controller 10 can perform a process to install a printer driver on the personal computer 1 and can perform operations of the printer driver installed on the personal computer 1. As described below, the CPU 11 of the controller 10 executes a process based on the steps of the flowcharts in FIGS. 11 and 12 in which a plurality of virtual printers are displayed on the display unit 15. The CPU 11 also performs an installation process described below.

The display unit 15 is connected to the controller 10 via a video card or graphics card (not shown). When a printer driver is installed on the personal computer 1, the controller 10 creates a virtual printer on the personal computer 1, as will be described later, that is displayed on the display unit 15 as an icon or as a virtual printer name in a list. The display unit 15 also displays a settings window (commonly called a Properties window), and a mouse pointer for setting printing conditions for the printer unit 20 (see FIG. 3) of the printer 3 or the multifunction device 4. The virtual printers and setting window displayed on the display unit 15 is implemented by a GUI (graphical user interface) well known in the art on the personal computer 1.

The input unit 16 is an input device, such as a keyboard, a tablet, or a mouse. The input unit 16 is connected to the controller 10 through a USB (universal serial bus) terminal (not shown). Through operations of the input unit 16, the user can input a command signal for installing a printer driver, settings for printing conditions on the printer 3 and multifunction device 4 controlled by the printer driver, and command signals for executing a printing process. The selection of virtual printers (described below) can be implemented by controlling the CPU 11 to monitor the operating position of the mouse pointer when the user operates the mouse and a click signal generated by the mouse.

The multifunction device 4 constituting the network system 6 includes the printer unit 20 (FIG. 3) disposed in the lower section thereof, a scanner unit 21 disposed in the upper section thereof, an original cover 23 including an automatic document feeder (ADF) 22, and a control panel 24 disposed on the front side of the top surface thereof. These components are integrally configured to form a multifunction product (MFP) having a printer function, scanner function, copier function, and facsimile function.

The printer unit 20 performs a printing process for recording images and text on recording paper based on print data including image data and text data transferred from the personal computer 1. The scanner unit 21 includes an image sensor, such as a CIS (contact image sensor; not shown), for scanning a document conveyed through the ADF 22 or placed on a document support 25, and transfers the scanned image data to the hard disk drive 14 of the personal computer 1 or a storage device in the multifunction device 4 (memory, hard disk drive). Of course, the multifunction device 4 can also perform a copy process without exchanging data with the personal computer 1, wherein the scanner unit 21 scans an image from an original document, and the printer unit 20 records the image on recording paper. A printer driver installed on the personal computer 1 controls the printing process implemented on the printer unit 20, while a scanner driver installed on the personal computer 1 controls the scanning process implemented on the scanner unit 21.

The printer 3 constituting the network system 6 has only the printer function and, hence, is a dedicated device for printing images on recording paper based on print data received from the personal computer 1. The scanner 2 constituting the network system 6 has only a scanner function and, hence, is a dedicated device for scanning image data from an original. These devices are controlled by the printer driver and scanner driver, respectively, installed on the personal computer 1.

Next, the printer driver installed on the personal computer 1 will be described. Printer drivers are commonly distributed to users via the Internet from the server of manufacture that created the driver, or are distributed on a CD-ROM or other storage medium. Here, an example will be given for installing a printer driver on the personal computer 1 from a CD-ROM distributed to users. In this installation process, a prescribed virtual printer is registered on the personal computer 1.

Figure 4:
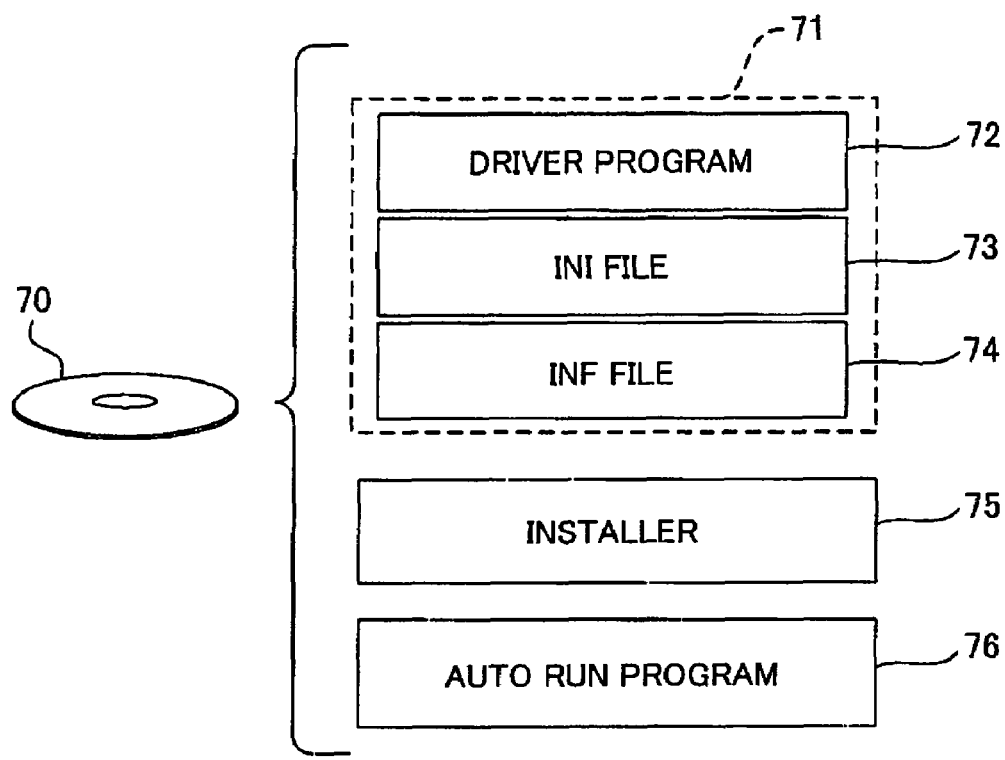
FIG. 4 is an explanatory diagram showing the data structure of a CD-ROM storing a printer driver.

Next, the data structure of the CD-ROM 70 will be described. As shown in FIG. 4, the CD-ROM 70 stores the printer driver 71, an installation program (hereinafter referred to as "installer") 75, and an autorun program 76. As described later, the printer driver 71 is installed on the personal computer 1. The installer 75 is for installing the printer driver 71 on the personal computer 1. The autorun program 76 is for automatically launching the installer 75 when the CD-ROM 70 is inserted into the CD-ROM drive 18.

The CD-ROM 70 stores the printer driver 71 used to control the printer unit 20 of the multifunction device 4. The printer driver 71 can be used for other printing devices that use a common driver. The printer driver 71 includes at least a main driver program 72, an INI file 73 saving settings for the main driver program 72, and a setup information file (hereinafter referred to as a "INF file") 74.

The INF file 74 stores data related to a plurality of printing conditions applied to the main driver program 72 and, more specifically, data related to a plurality of printing conditions having different default settings. For example, as shown in Table 1 below, virtual printer names (listed in the right column) created when installing the printer driver are saved and managed by ID numbers (listed in the left column) recognized by the operating system of the personal computer 1. Obviously, printing conditions corresponding to these ID numbers and virtual printer names are also saved.

TABLE 1

| ID no. | Virtual printer name |
|---|---|
| ABC.001 | ABC Printer: Normal (A4) |
| ABC.002 | ABC Printer: Fine (A4) |
| ABC.003 | ABC Printer: Fast (A4) |
| ABC.004 | ABC Printer: Economy (A4) |
| ABC.005 | ABC Printer: Photo (A4) |
| ABC.006 | ABC Printer: Borderless photo (3.5 × 5 in.) |
| ABC.007 | ABC Printer: Postcard |
| ABC.008 | ABC Printer: InkJet postcard |

The INF file 74 stores printing conditions set to default values that are different for each virtual printer name shown in Table 1. Here, printing conditions are data set for controlling printing processes executed by the printer unit 20 of the multifunction device 4 or the printer 3. For example, this data may include the media type, printing quality, the option of borderless printing, paper size, layout, printing orientation, and number of copies, as well as the printing mode, the type of image being printed, the option of duplex printing, and the option of binding.

Figure 5:
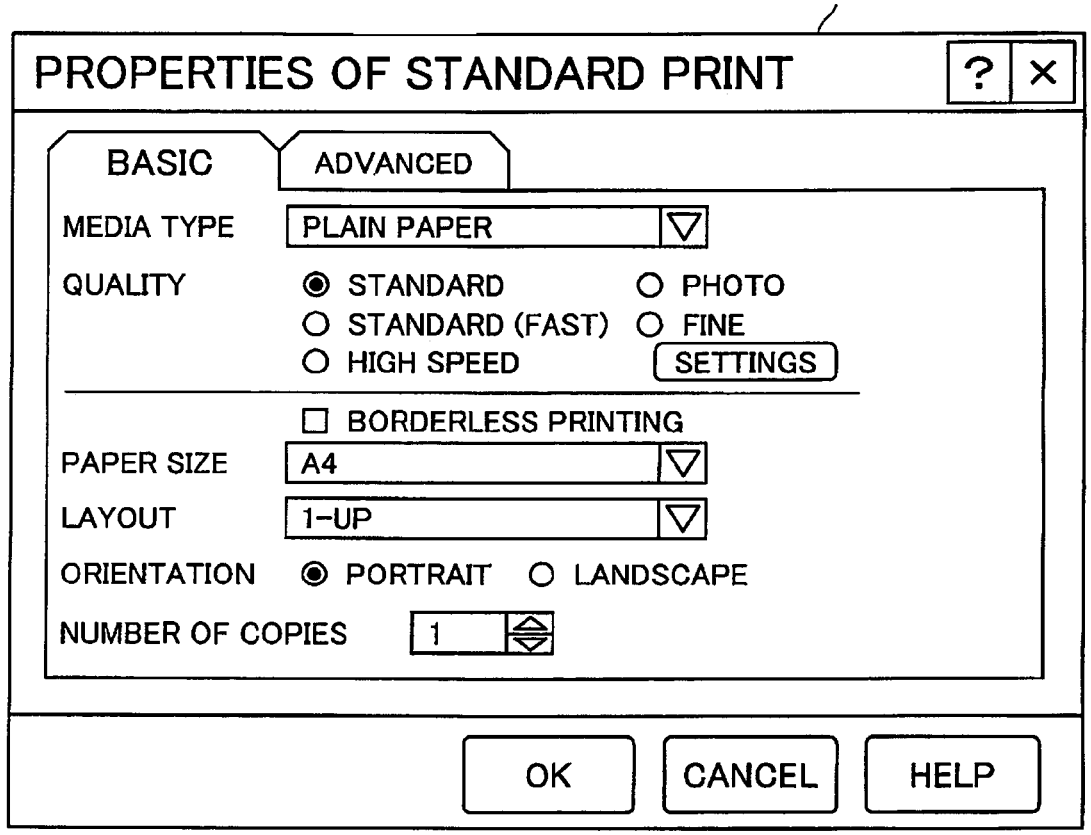
FIG. 5 is a screenshot showing a Properties window of a printer driver for "ABC Printer: Normal (A4)"
Figure 6:
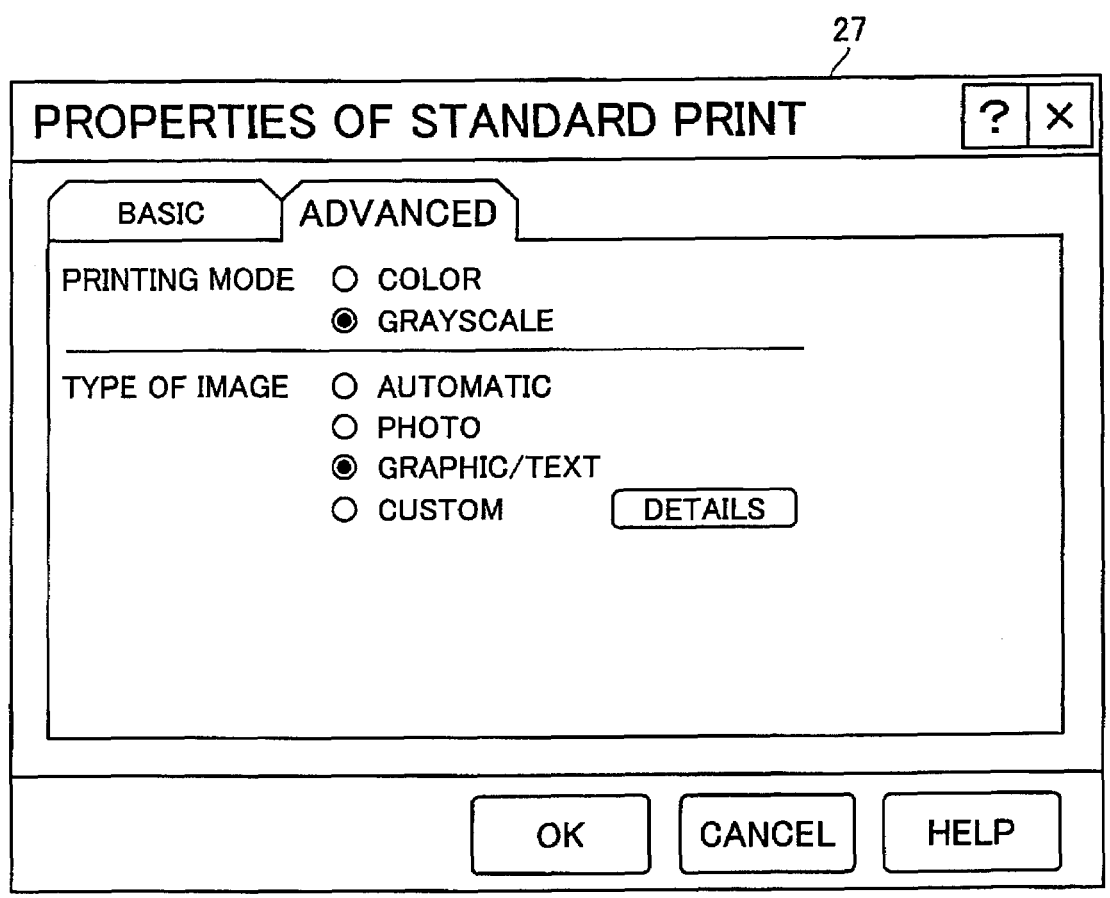
FIG. 6 is a screenshot showing a Properties window of a printer driver for "ABC Printer: Normal (A4)"
Figure 7:
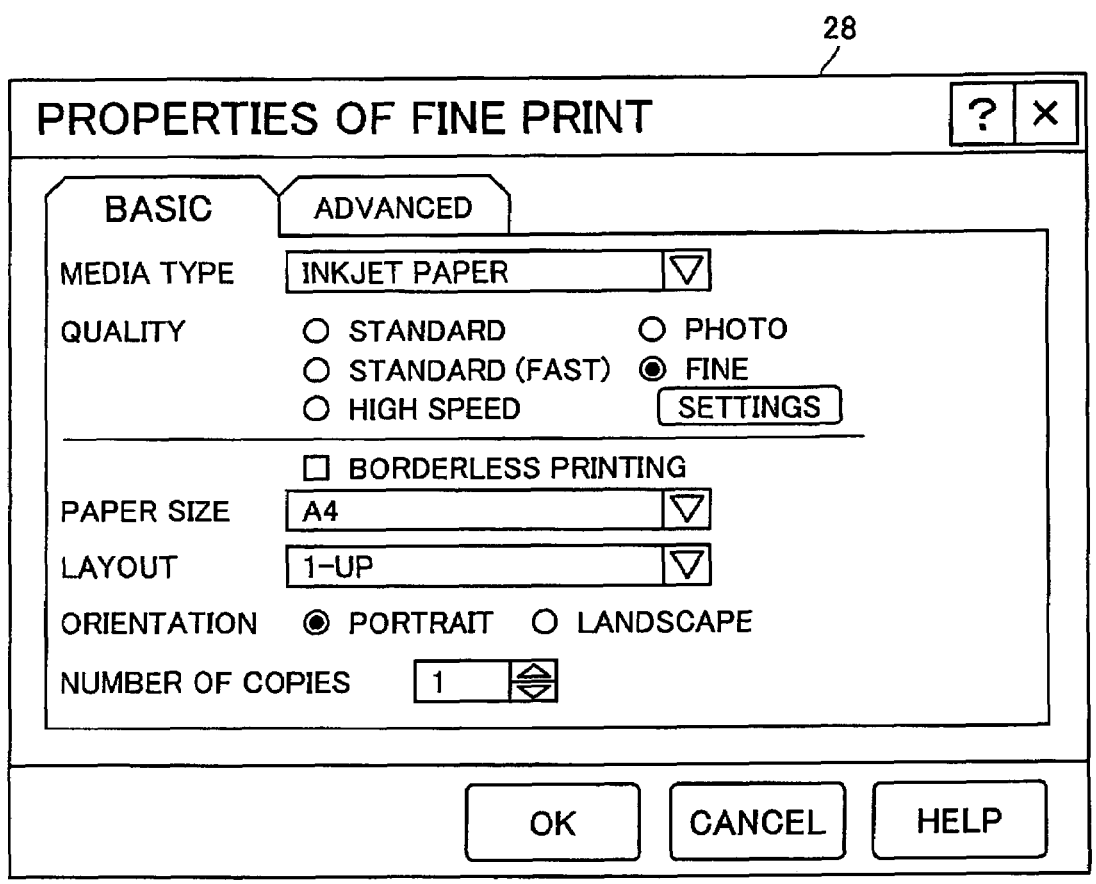
FIG. 7 is a screenshot showing a Properties window of a printer driver for "ABC Printer: Fine (A4)"
Figure 8:
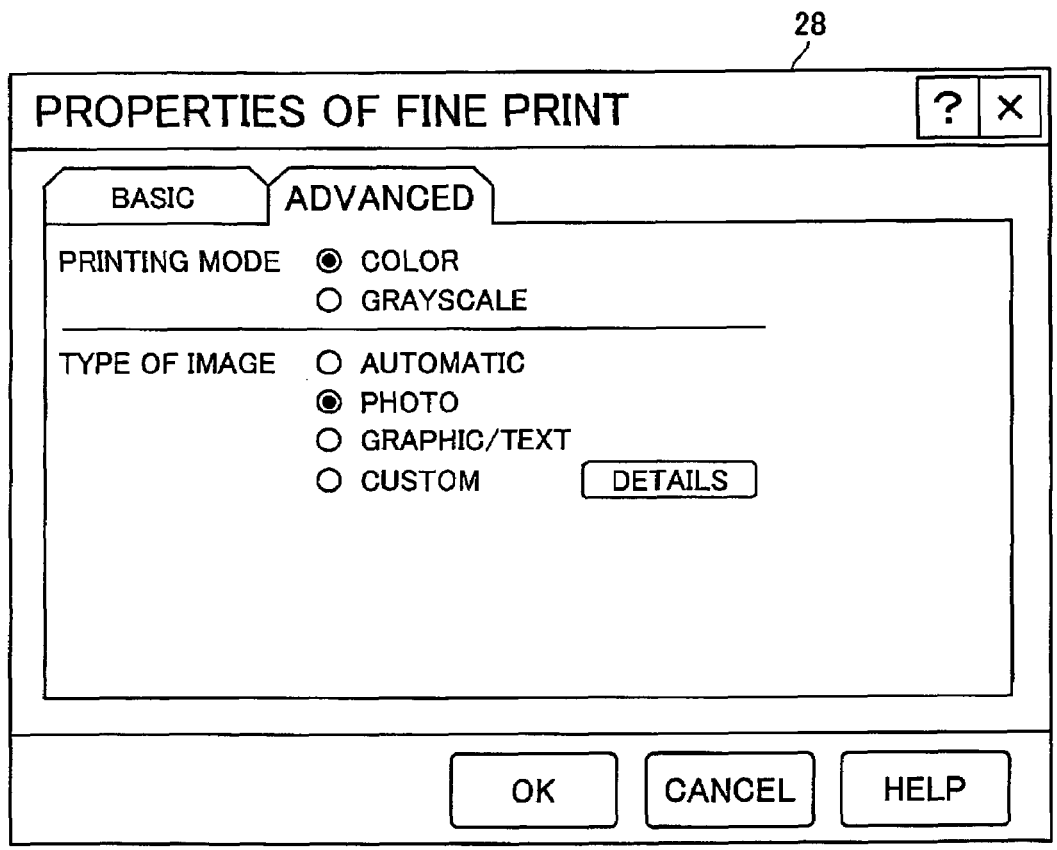
FIG. 8 is a screenshot showing a Properties window of a printer driver for "ABC Printer: Fine (A4)"
Figure 9:
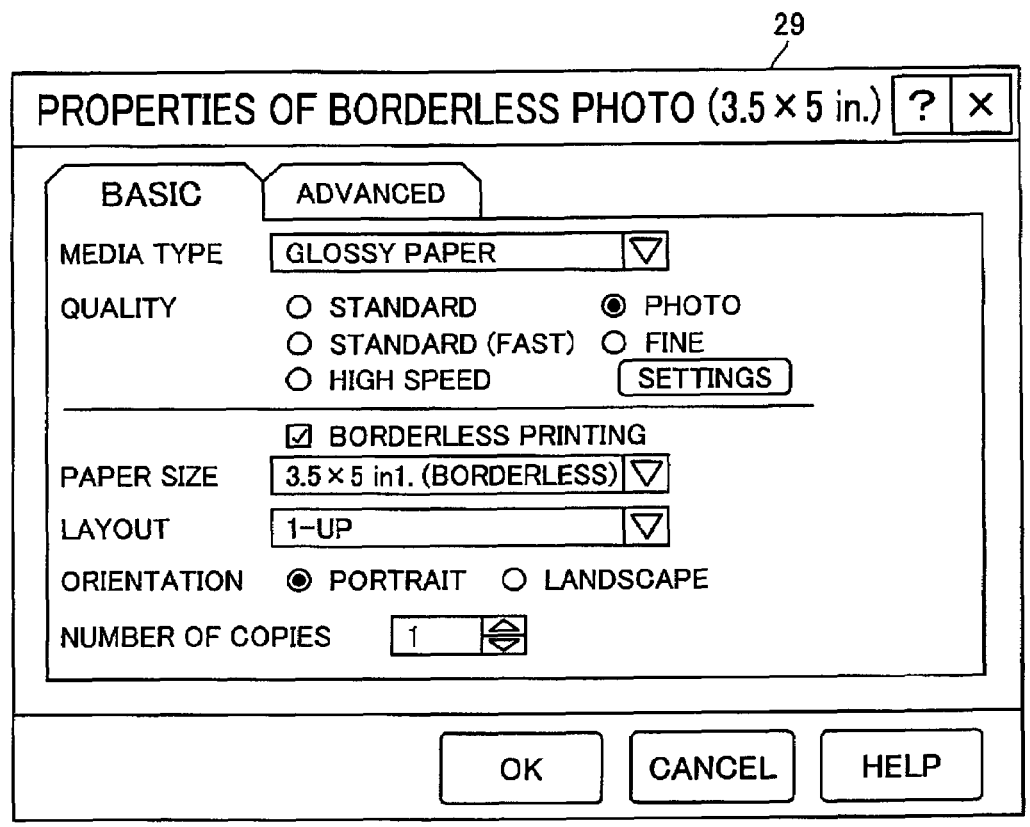
FIG. 9 is a screenshot showing a Properties window of a printer driver for "ABC Printer: Borderless photo (3.5×5 in.) "
Figure 10:
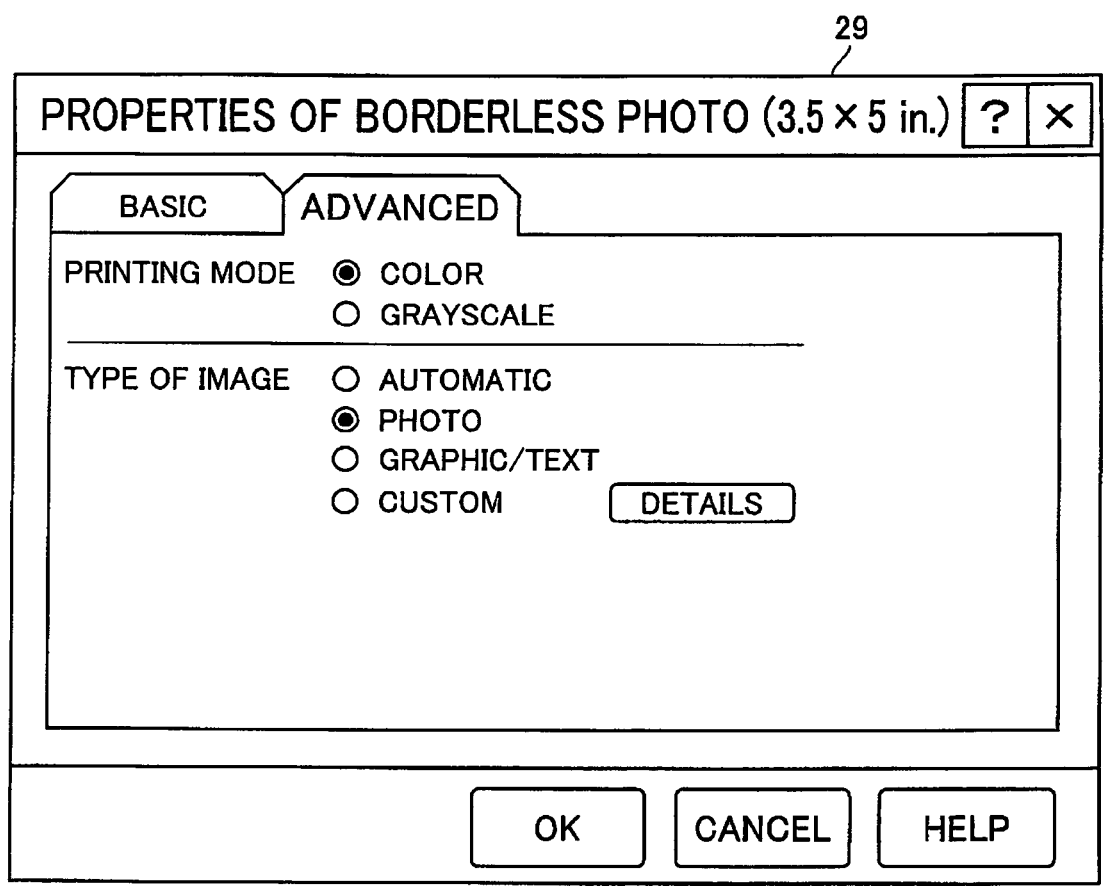
FIG. 10 is a screenshot showing a Properties window of a printer driver for "ABC Printer: Borderless photo (3.5×5 in.) "

As shown in Table 1, the virtual printers have been given names associated with their corresponding printing conditions. Specifically, the names attached to the virtual printers are a brief description of the default settings for their printing conditions. In other words, the virtual printer name includes descriptive data of the corresponding printing conditions. Hence, when the virtual printer names are displayed on the display unit 15, the user can understand the general content of the printing conditions for each virtual printer. For example, the virtual printer "ABC Printer: Normal (A4)" shown in Table 1 has the following settings in the Basic tab of a Properties window 27, shown in FIG. 5. As shown in FIG. 5, the media type is set to "Plain paper," the print quality is set to "Normal," the paper size to "A4," the layout to "1-up," the orientation to "Portrait," the number of copies to "1," and borderless printing is not selected. In the Advanced tab of the Properties window 27 shown in FIG. 6, the printing mode is set to "Grayscale," and the type of image to "Graphics/Text." Since this virtual printer has the most commonly used printing conditions as the default settings, the virtual printer has been given the name "ABC Printer: Normal (A4)." Here, FIGS. 5 and 6 are screenshots showing the Properties window 27 of the virtual printer "ABC Printer: Normal (A4)" illustrating the default settings of printing conditions. Obviously, the Properties window 27 is displayed when the virtual printer "ABC Printer: Normal (A4)" is registered on the personal computer 1. FIGS. 7 and 8 are screenshots showing a Properties window 28 of a printer driver for "ABC Printer: Fine (A4)". FIGS. 9 and 10 are screenshots showing a Properties window 29 of a printer driver for "ABC Printer: Borderless photo (3.5×5 in.)".

As shown in FIGS. 7 and 8, the virtual printer "ABC Printer: Fine (A4)" shown in Table 1 differs from the virtual printer "ABC Printer: Normal (A4)" in that the media type is set to "Inkjet paper," the printing quality to "Fine," the printing mode to "Color," and the type of image to "Photo." Other printing conditions are set identical to the content for the virtual printer "ABC Printer: Normal (A4)."

As shown in FIGS. 9 and 10, the virtual printer "ABC Printer: Borderless photo (3.5×5 in.)" shown in Table 1 differs from the virtual printer "ABC Printer: Normal (3.5×5 in.)" in that the media type is set to "Glossy paper," the printing quality to "Photo," the paper size to "3.5×5 in," the type of image to "Color," and borderless printing has been selected. All other conditions are set identical to the content for the virtual printer "ABC Printer: Normal (3.5×5 in.)." In this example, the printing quality varies among resolution settings "Normal," "Fine," and "Photo." "Normal" resolution is 600 dpi, "Fine" resolution is 1200 dpi, and "Photo" resolution is 2400 dpi. Similarly, other virtual printers listed in Table 1 have default printing conditions that can be imagined from the virtual printer name.

When the CD-ROM 70 is inserted into the CD-ROM drive 18 of the personal computer 1 (see FIG. 2), the CPU 11 of the controller 10 reads the autorun program 76 and automatically starts the installer 75 on the CD-ROM 70 (see FIG. 4) according to the autorun program 76. That is, the installer 75 is the program for registering virtual printers on the personal computer 1.

Next, a process for installing the printer driver 71 from the CD-ROM 70 onto the personal computer 1 after starting the installer 75 will be described with reference to the flowcharts in FIGS. 11 and 12. In the following description, S1, S2, and the like indicate the step numbers ("S" being an abbreviation of "step") in the process indicated in FIGS. 11 and 12. The process begins from S1 in FIG. 11. While the following description covers the example of the installer 75 stored on the CD-ROM 70, the installer 75 may also be prestored on the hard disk drive 14 of the personal computer 1 and executed from the hard disk drive 14 when the CD-ROM 70 is inserted.

Figure 11:
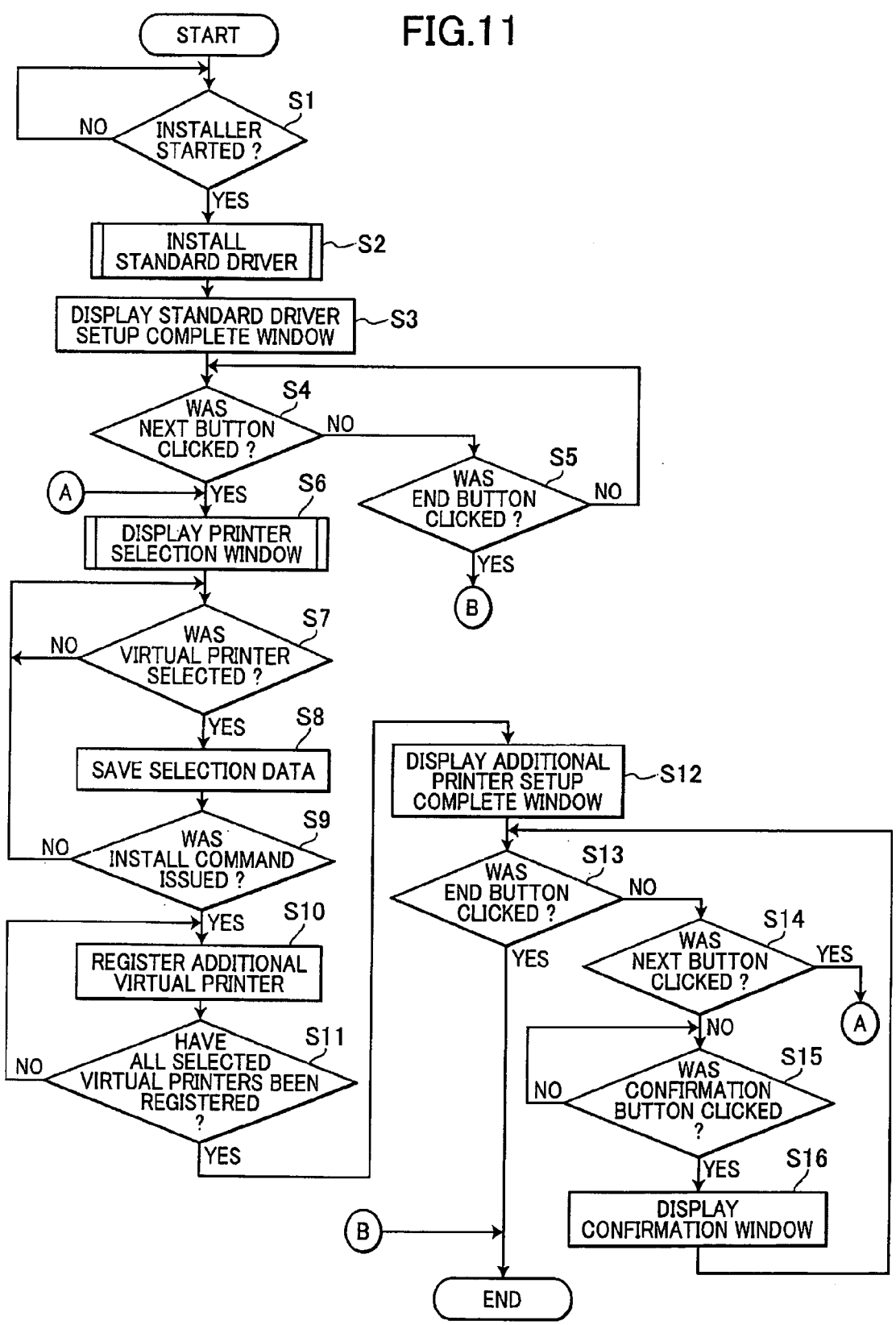
FIG. 11 is a flowchart illustrating steps in an installation process executed by a CPU.

In S1 of FIG. 11, the CPU 11 determines whether the installer 75 has been started. When the CD-ROM 70 is inserted into the CD-ROM drive 18, the CPU 11 begins searching for an executable file autorun.inf of the autorun program 76 stored on the CD-ROM 70. Upon finding the autorun.inf file, the CPU 11 automatically executes the installer 75 on the CD-ROM 70 based on data in the autorun.inf file. If autorun.inf is not included on the CD-ROM 70, the user must input an installer start command from the input unit 16 to execute the installer 75.

When the CPU 11 determines that the installer 75 has started in S1, in S2 the CPU 11 begins the installation process for installing the main driver program 72. The installation process displays a plurality of user interface windows (hereinafter abbreviated as "windows") on the display unit 15 based on commands received from the user. The windows display prescribed information for the user and accept commands from the user inputted via the input unit 16 through operations on the mouse or other pointing device. FIGS. 13 through 16 show the order of windows displayed on the display unit 15.

When the installer 75 is started, the CPU 11 first displays a Setup Start window 31 (see FIG. 13) on the display unit 15. The Setup Start window 31 notifies the user that the installation process is now starting. By clicking on a Next button 39 in the Setup Start window 31, the user can display a License Contract window 32 shown in FIG. 14. By clicking on a Cancel button 40 in FIG. 13, the user can cancel the installation process.

Figure 14:
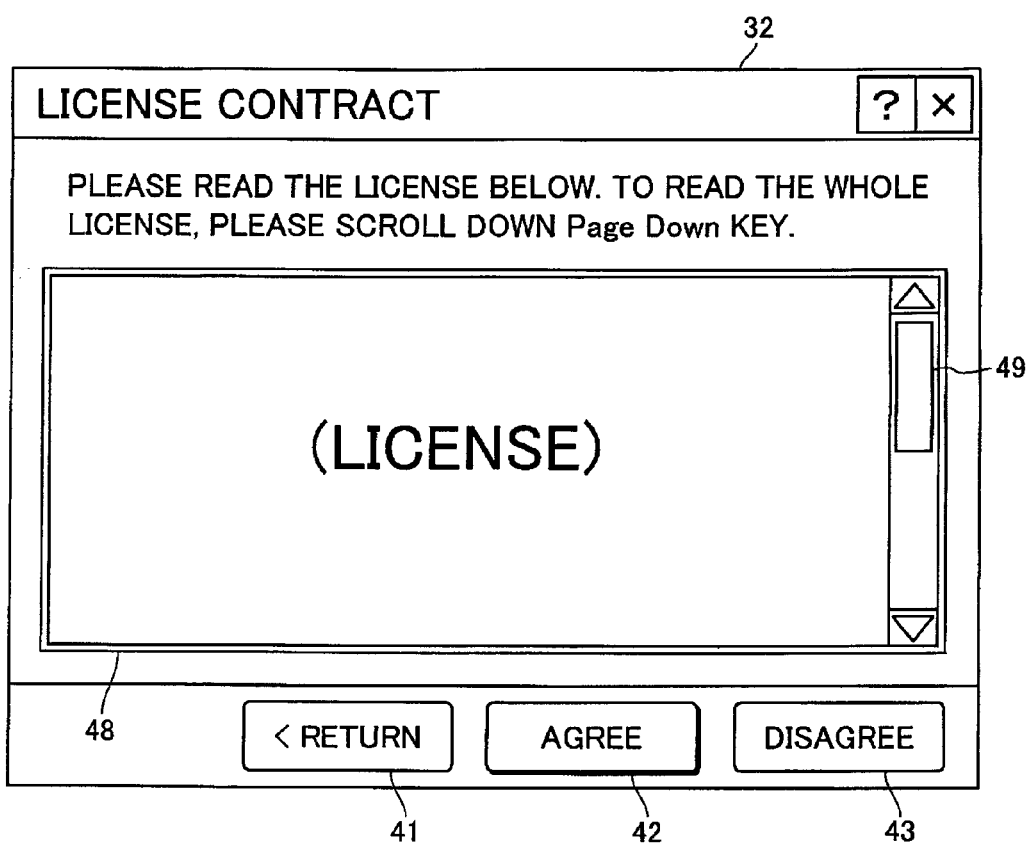
FIG. 14 is a screenshot of a License Contract window.
Figure 15:
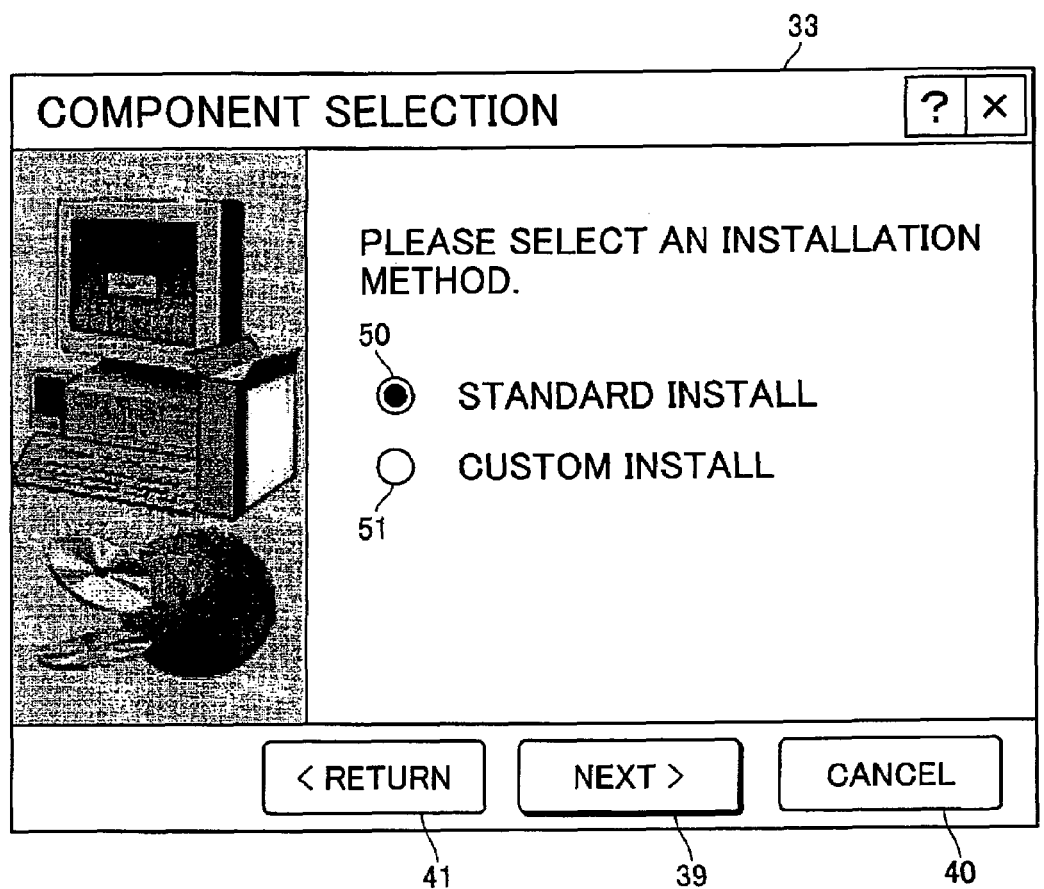
FIG. 15 is a screenshot of a Component Selection window.

The License Contract window 32 shown in FIG. 14 includes a Back button 41, an Agree button 42, a Disagree button 43, and a scrollable window 48 detailing the licensing agreement for installing the printer driver on the personal computer 1. The user can read the entire content of the licensing agreement by operating the scrollbar 49. After the user clicks on the Agree button 42 in the License Contract window 32, a Component Selection window 33 shown in FIG. 15 is displayed. If the user clicks on the Disagree button 43, the installation process is cancelled. Further, by clicking on the Back button 41, the user can return to the previous screen, which in this case is the Setup Start window 31 shown in FIG. 15.

The Component Selection window 33 shown in FIG. 15 notifies the user of a plurality of installation methods, and prompts the user to select one of the methods. In this example, the user can select among "Standard installation" and "Custom installation." The Component Selection window 33 includes checkboxes 50 and 51 on the left side of the "Standard installation" and "Custom installation," respectively, which the user checks to select the installation method. After selecting an installation method, the user clicks the Next button 39 to display a Connection Selection window 34 shown in FIG. 16 on the display unit 15. FIG. 15 shows an example of selecting "Standard installation" in FIG. 15 as the installation method. When "Standard installation" has been selected, the main driver program 72 is copied to the system folder as the standard driver, and the virtual printer "ABC Printer: Normal (A4)" is registered in a registry on the hard disk drive 14, as will be described later. In other words, the standard driver is installed when the virtual printer "ABC Printer: Normal (A4)" is registered.

Figure 16:
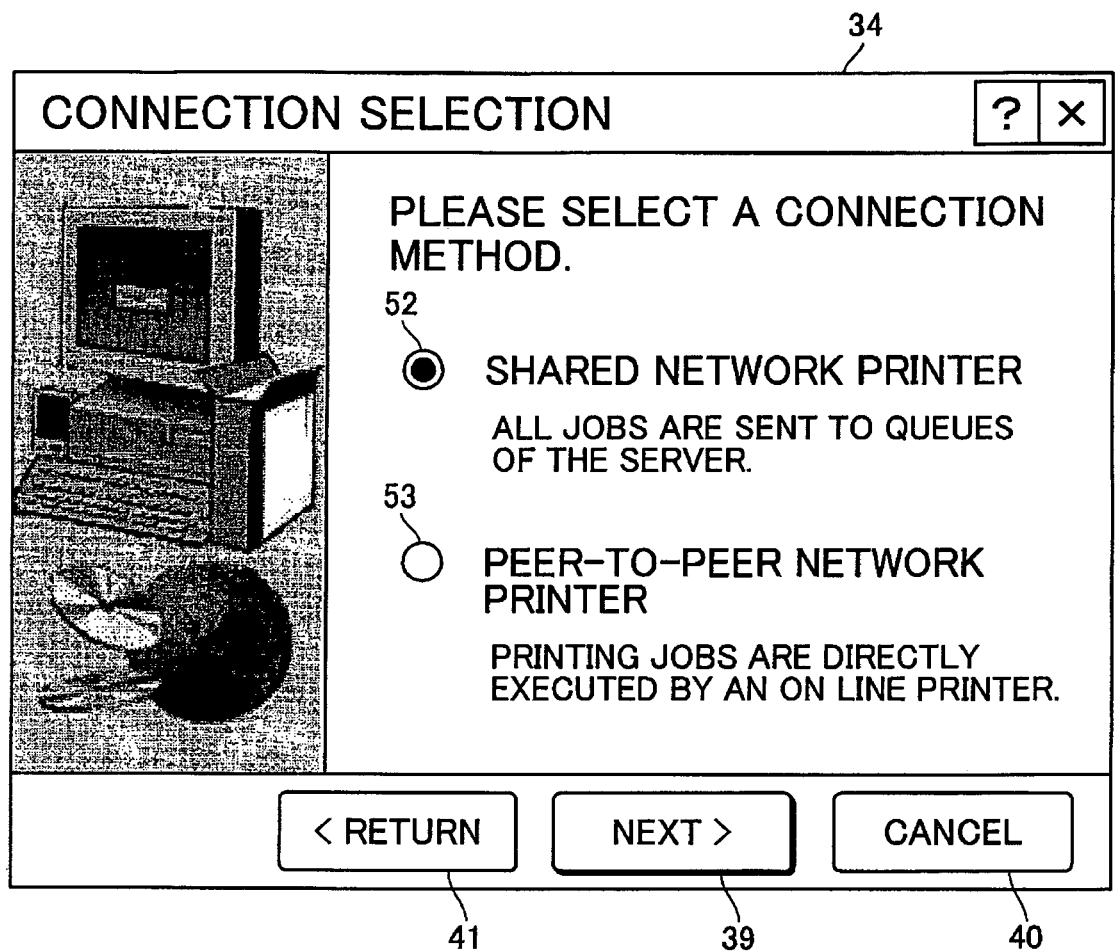
FIG. 16 is a screenshot of a Connection window.

The Connection Selection window 34 shown in FIG. 16 indicates the connection format between the multifunction device 4 and the personal computer 1. In this window, the user sets the connection format with the multifunction device 4 to a shared network connection or a peer-to-peer connection. Check boxes 52 and 53 are provided to the left of "Shared network printer" and "Peer-to-peer network printer," respectively, displayed in the Connection Selection window 34, which the user checks to select the corresponding connection format. In this example, the connection format "Shared network printer" has been selected in FIG. 16.

After selecting "Shared network printer" in the Connection Selection window 34, the user clicks on the Next button 39 to install the standard driver. Specifically, when the user clicks the Next button 39, the CPU 11 copies the printer driver 71 from the CD-ROM 70 into the system folder on the hard disk drive 14 of the personal computer 1. In other words, the main driver program 72, INI file 73, and INF file 74 are copied into the system folder. By copying the files, the CD-ROM 70 is no longer needed for adding additional virtual printers after installing the standard driver. While the INF file 74 is copied to the system folder of the hard disk drive 14 in this example, the INF file 74 need not be copied to the system folder. For example, it is not necessary to copy the INF file 74 to the system folder if the required printing conditions are read from the CD-ROM 70.

Next, the CPU 11 of the personal computer 1 searches for a printer connected to the network 5. At this time, the CPU 11 searches for a printer corresponding to the installed main driver program 72. In this example, the CPU 11 locates the multifunction device 4. Upon locating the multifunction device 4, the CPU 11 establishes an output port for transmitting print data from the personal computer 1 to the multifunction device 4. In this example, the transmission protocol for sending print data is established when the user selects "Shared network printer" in the Connection Selection window 34 of FIG. 16. Further, the IP address to which print data is sent when the multifunction device 4 is located. By associating the transmission protocol and IP address, a virtual output port for transmitting print data from the personal computer 1 to the multifunction device 4 is registered in the OS. In other words, the virtual output port is allocated to the personal computer 1 as a port for outputting print data to the multifunction device 4.

More specifically, the CPU 11 of the personal computer 1 locates the printer connected to the network 5. Here, the CPU 11 searches for a printer corresponding to the installed main driver program 72. In this example, the CPU 11 locates the multifunction device 4. Upon locating the multifunction device 4, the CPU 11 establishes an output port for transmitting print data from the personal computer 1 to the multifunction device 4. Specifically, when transmitting print data using the transmission control protocol (TCP), an unused TCP port in the personal computer 1 is automatically allocated as an output port for the multifunction device 4.

Next, the OS is notified of the virtual printer name recorded in the registry on the hard disk drive 14, the port number for the multifunction device 4, and ID data of the main driver program 72 copied to the system folder. Here, the CPU 11 notifies the OS of the virtual printer name "ABC Printer: Normal (A4)." The CPU 11 notifies the OS by outputting a command for registering a virtual printer in the registry based on the notification data. Upon receiving the command, the OS registers the virtual printer having the name "ABC Printer: Normal (A4)" in the registry. Specifically, a registry area for the virtual printer "ABC Printer: Normal (A4)" is provided in the registry on the hard disk drive 14. This registry area stores the virtual printer name "ABC Printer: Normal (A4)," the ID number "ABC.001" (see Table 1) indicated printing conditions of the virtual printer, ID data identifying the location of the main driver program 72, and the port number.

After registering the virtual printer "ABC Printer: Normal (A4)" in the registry in this way, the installation process for the standard driver ends. Registering the virtual printer in the registry enables the CPU 11 to identify other virtual printers registered later. Further, the CPU 11 can execute the main driver program 72 identified based on the ID data for selecting a virtual printer for a printing operation, and can apply the printing conditions identified by the number "ABC.001" of the virtual printer to the main driver program 72.

Figure 17:
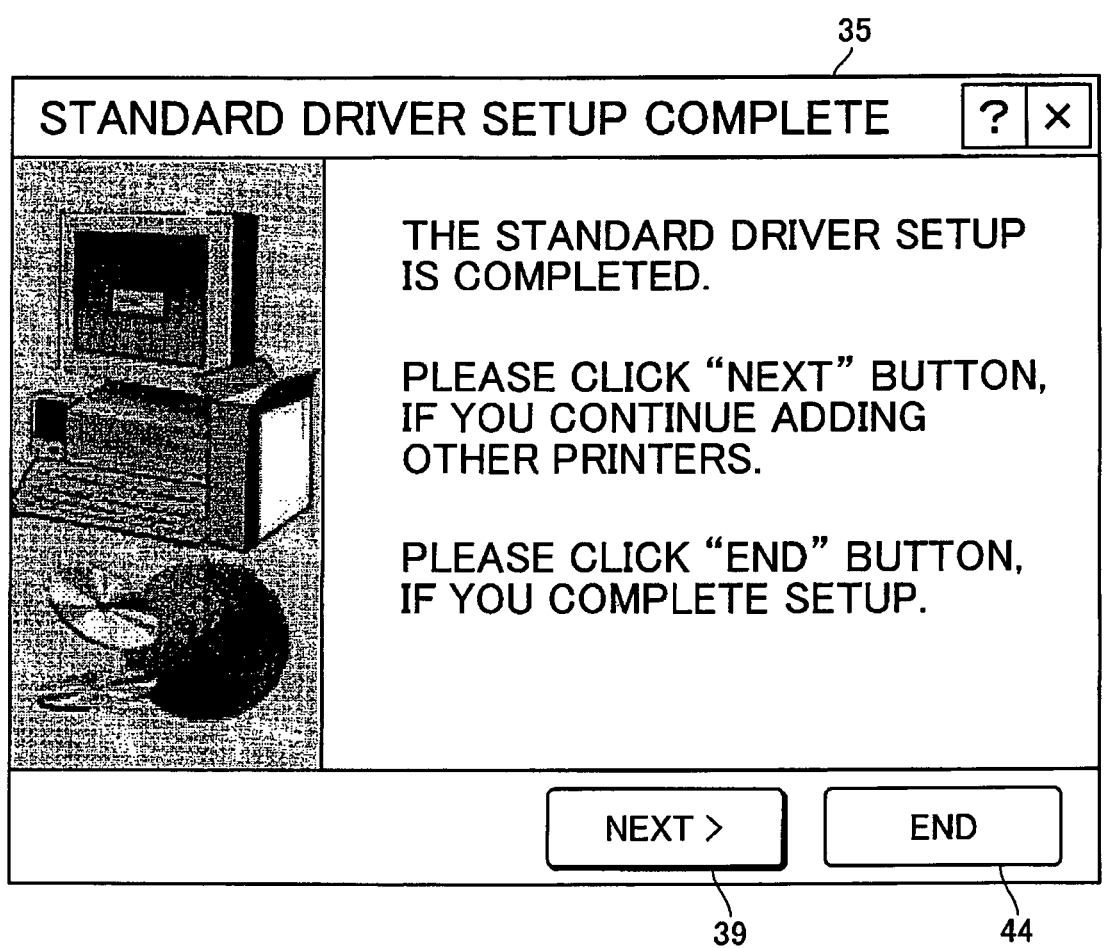
FIG. 17 is a screenshot of a Setup Complete window for a standard driver.

After the standard driver has been installed in S2, in S3 the CPU 11 displays a Standard Driver Setup Complete window 35 shown in FIG. 17 on the display unit 15 based on the installer. The Standard Driver Setup Complete window 35 notifies the user that installation of the standard driver is complete. While conventional installers generally display a notification in a window notifying the user that the installation process is complete and only an End button 44, the Standard Driver Setup Complete window 35 of this example shown in FIG. 17 displays a message asking the user whether to continue adding virtual printers and provides the Next button 39 for inputting an instruction to start a process in the installer for registering additional virtual printers.

In S4 the CPU 11 determines whether the user has clicked on the Next button 39 in the Standard Driver Setup Complete window 35. The CPU 11 makes this determination by detecting whether a signal has been generated by the user clicking on the Next button 39. If the CPU 11 determines that the Next button 39 has been selected (S4: YES), then the CPU 11 advances to the process of S6. However, if the Next button 39 has not been clicked (S4: NO), then in S5 the CPU 11 determines whether the user has clicked the End button 44. If the user has clicked the End button 44 (S5: YES), then the process of installing the printer driver ends.

Figure 18:
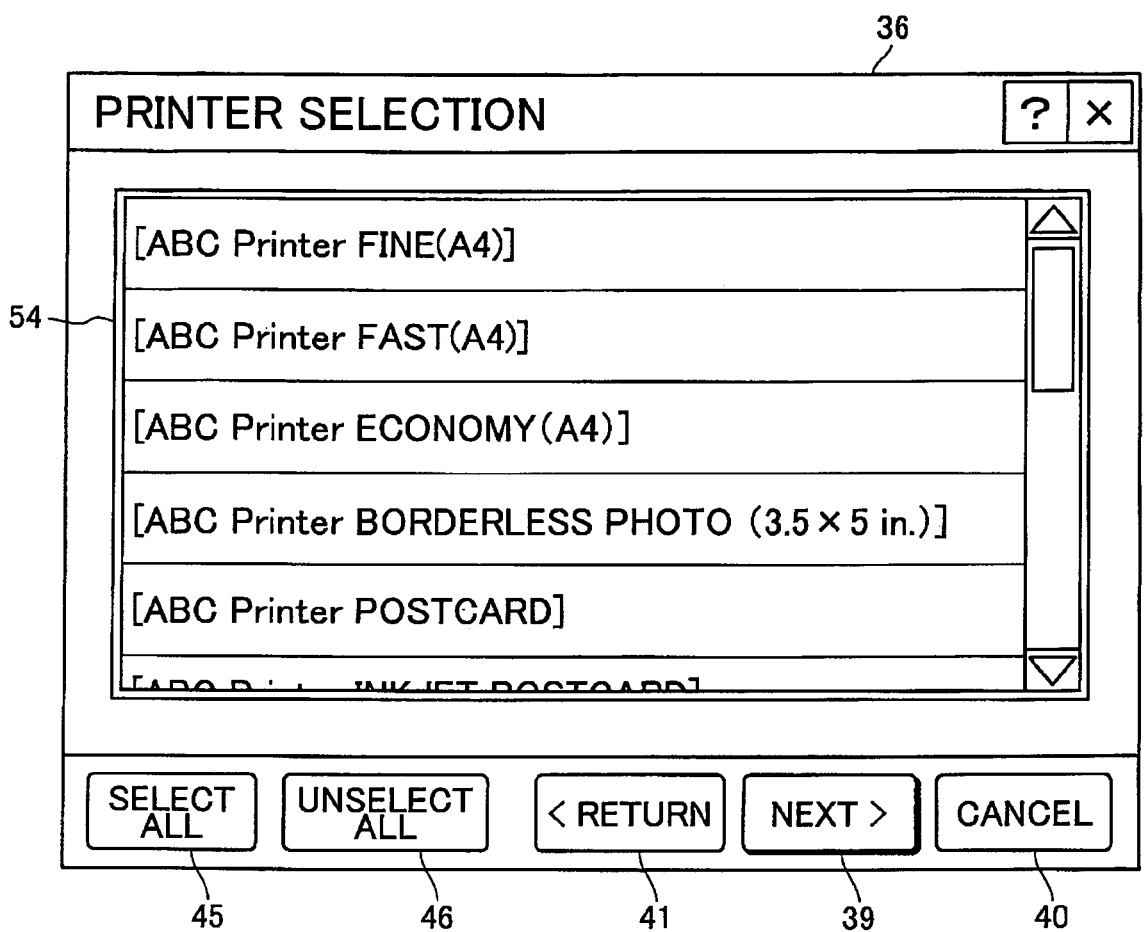
FIG. 18 is a screenshot of a Printer Selection window.

In S6 the CPU 11 displays a Printer Selection window 36 shown in FIG. 18 on the display unit 15. The Printer Selection window 36 enables the user to select a desired driver from a plurality of virtual printers. The Printer Selection window 36 includes a Select All button 45, a Unselect All button 46, the Back button 41, the Next button 39, the Cancel button 40, and a scrollable window 54 displaying a list of virtual printer names as ID data for the virtual printers. By clicking on the Select All button 45, the user can select all virtual printers displayed in the scrollable window 54. By clicking on the Unselect All button 46, the user can delete all selected virtual printers.

Figure 12:
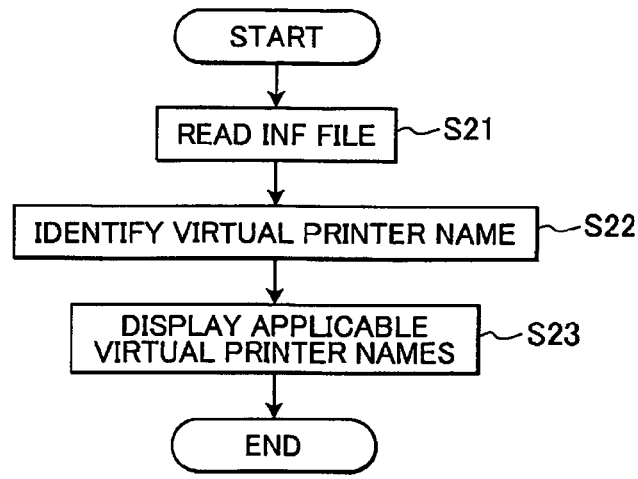
FIG. 12 is a flowchart illustrating steps in a display process executed by the CPU for displaying a Printer Selection window.
Figure 13:
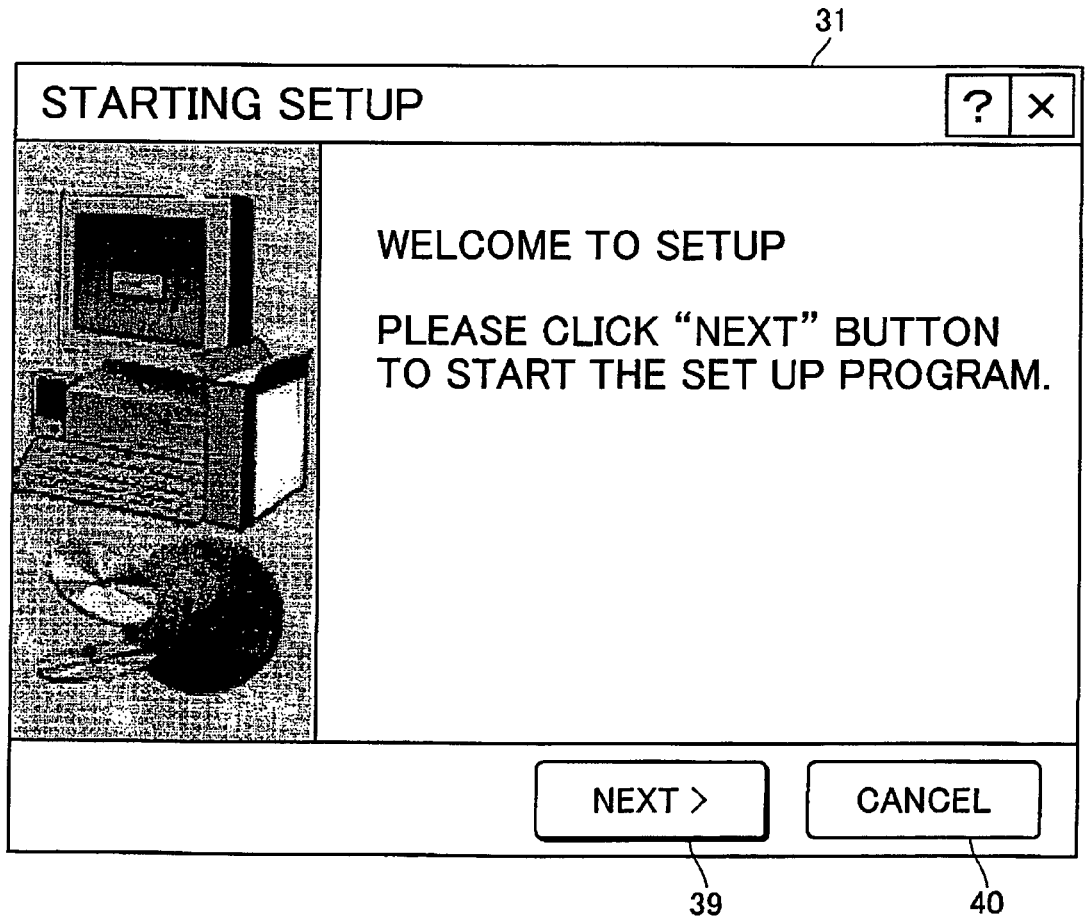
FIG. 13 is a screenshot of a Setup Start window.

The CPU 11 displays the scrollable window 54 inside the Printer Selection window 36 according to the process indicated by the flowchart in S6 (S21-S24), as shown in FIGS. 11 and 12. In S21 of the display process, the CPU 11 reads the INF file 74 from the system folder of the hard disk drive 14 and temporarily stores the INF file 74 in the RAM 13 (see FIG. 2) If the INF file 74 has not been copied to the hard disk drive 14, the CPU 11 reads the INF file 74 from the CD-ROM 70. If the personal computer 1 is not equipped with the CD-ROM drive 18, but the personal computer 1 is connected to a LAN or other network, the CPU 11 acquires the INF file 74 via the LAN.

After reading the INF file 74, in S22 the CPU 11 extracts virtual printer names shown in Table 1 from the INF file 74 and identifies virtual printers for the printing conditions saved in the INF file 74.

After completing the identification process in S22, in S23 the CPU 11 displays the identified virtual printer names on the display unit 15. Specifically, the CPU 11 first extracts the virtual printer names corresponding to the INF file 74 stored in the RAM 13 and converts the virtual printer names to data that can be displayed on the display unit 15, and subsequently transfers the converted data to the display unit 15. As described above, the virtual printer names in this example include a general description of the printing conditions. Accordingly, the user can view detailed default settings of printing conditions for the virtual printers displayed in the display unit 15 and can easily discern an outline of the settings.

Figure 19:
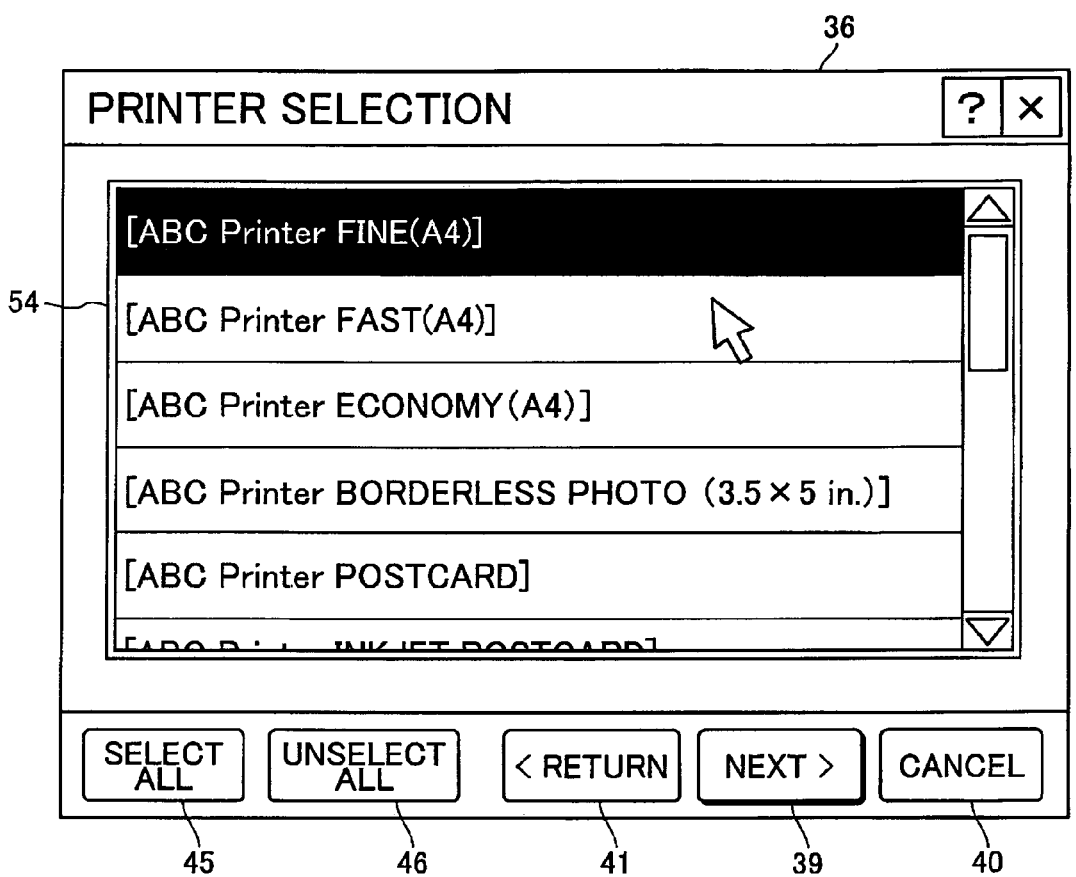
FIG. 19 is a screenshot of the Printer Selection window with a highlighted driver name.

When the CPU 11 displays the Printer Selection window 36 in the display unit 15 in this way, the user can select which of the virtual printers to add. In S7 the CPU 11 determines whether the user has performed a mouse operation to select (specify) any of the virtual printers in the Printer Selection window 36. To make this determination, the CPU 11 determines whether a signal has been generated by the user operating the mouse to single-click on a virtual printer name that is displayed at the location of the mouse pointer. The user can also select a plurality of virtual printers in the Printer Selection window 36. If the user has selected any of the virtual printers displayed in the Printer Selection window 36 (S7: YES), the CPU 11 highlights the selected virtual printer names, as shown in FIG. 19, to clearly indicate the selected virtual printers. In S8 the CPU 11 temporarily stores ID data (shown in the left column of Table 1) indicating the selected virtual printers in the RAM 13 as selection data. If the user has clicked on the Select All button 45, all of the virtual printers displayed in the scrollable window 54 are selected and highlighted. If the user has clicked on the Unselect All button 46, the CPU 11 unselects the virtual printers in the scrollable window 54 and removes any highlights. This process enabling the user to select desired virtual printers.

Figure 20:
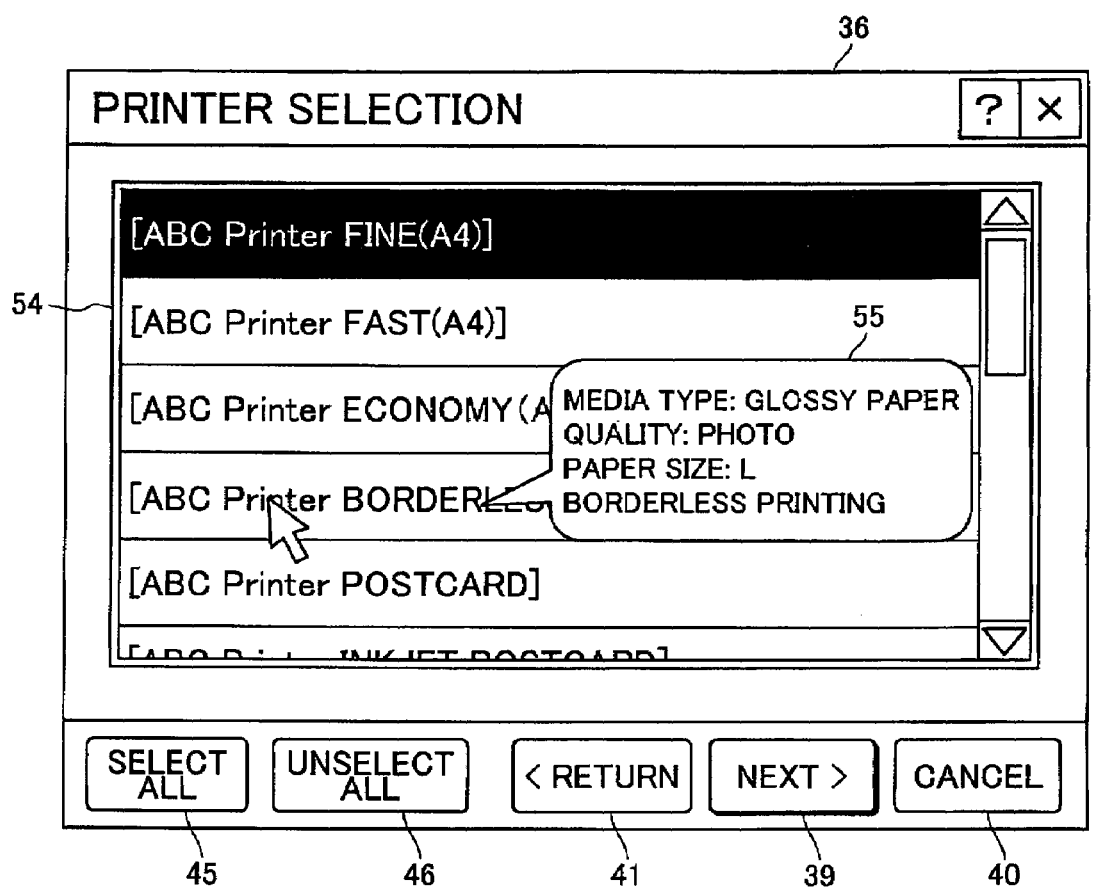
FIG. 20 is a screenshot of the Printer Selection window displaying printing conditions in a popup window.

In this example, as shown in FIG. 20, if the user moves the mouse pointer over a virtual printer name in the Printer Selection window 36 and leaves the mouse pointer in this position for a prescribed time (a few seconds, for example), the CPU 11 displays a popup window 55. The popup window 55 includes a description of the primary settings for printing conditions corresponding to the virtual printer indicated by the mouse pointer. The primary printing conditions displayed in the popup window 55 include the media type, printing quality, paper size, and borderless print setting. Specifically, if the mouse pointer has remained static over a virtual printer name for the prescribed time, the CPU 11 references printing conditions from the INF file 74 in the system folder, extracts settings for the primary printing conditions, and converts the content to text data. Subsequently, the CPU 11 generates the popup window 55 containing this text data and outputs the popup window 55 to the display unit 15. When displaying the popup window 55 in this way, it is preferable to have copied the INF file 74 to the system folder so that the popup window 55 can be displayed quickly. By displaying the popup window 55, the user can quickly and easily learn content of the print settings if such content is not readily understandable from only the virtual printer names. While the content of the primary settings is displayed in a popup window format in this example, this content may also be displayed in a dialog box format or other display format. Further, it should be apparent that the primary settings are not limited to the settings described above. It is also possible to display the content of all settings rather than just the primary settings. Obviously, it would also be possible to display content of settings that the user desires by allowing the user to modify which settings are displayed.

If a virtual printer has been selected in S7 (S7: YES), then in S8 the CPU 11 stores the selection data and in S9 determines whether a command has been inputted to install the selected virtual printer. In other words, the CPU 11 determines whether the user has clicked on the Next button 39 after selecting one of the virtual printers in the Printer Selection window 36. Hence, the process of S7 and S8 is repeated until an installation command has been inputted. If the user clicks on the Cancel button 40, then the process for registering an additional virtual printer is canceled.

When the user clicks on the Next button 39 in the Printer Selection window 36 (S9: YES), then in S10 the CPU 11 executes a process to register the additional virtual printers. In this additional virtual printer registering process, the CPU 11 first reads printing conditions from the INF file corresponding to the selected virtual printer. Next, the CPU 11 issues a command to the OS for registering the virtual printer. Upon receiving the command, the OS registers the virtual printer in the registry based on the printing conditions read by the CPU 11. The steps in this registration process are identical to the steps described in S2 for registering the virtual printer when installing the standard driver and, hence, a description of this process will not be repeated. Selection data for the additionally registered virtual printer is subsequently deleted from the RAM 13.

In S11 the CPU 11 determines whether there are any remaining virtual printers to be registered after each virtual printer is registered in the registry. The CPU 11 can make this determination based on whether selection data is stored in the RAM 13, for example. Hence, the process of S10 and S11 is repeated until the CPU 11 determines that no virtual printers remain to be added. If the user has selected a plurality of virtual printers, the virtual printers are registered sequentially in a prescribed order.

Figure 21:
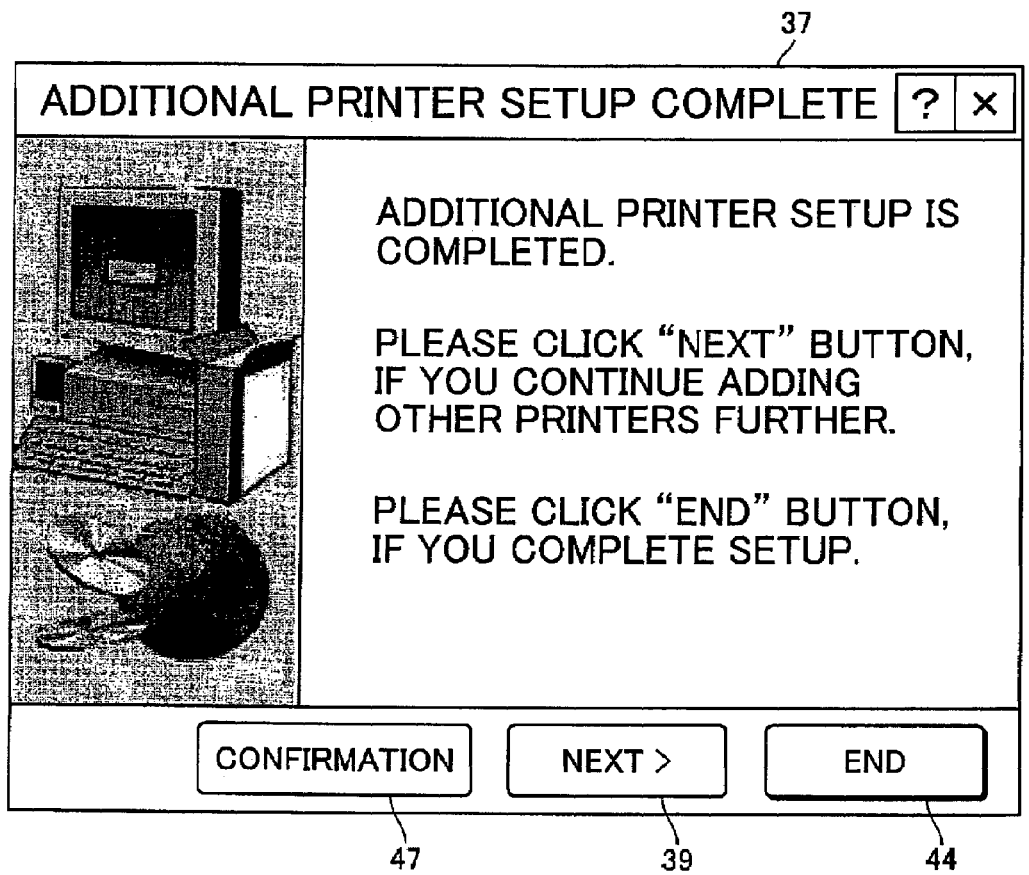
FIG. 21 is a screenshot of an Additional Printer Setup Complete window.
Figure 22:
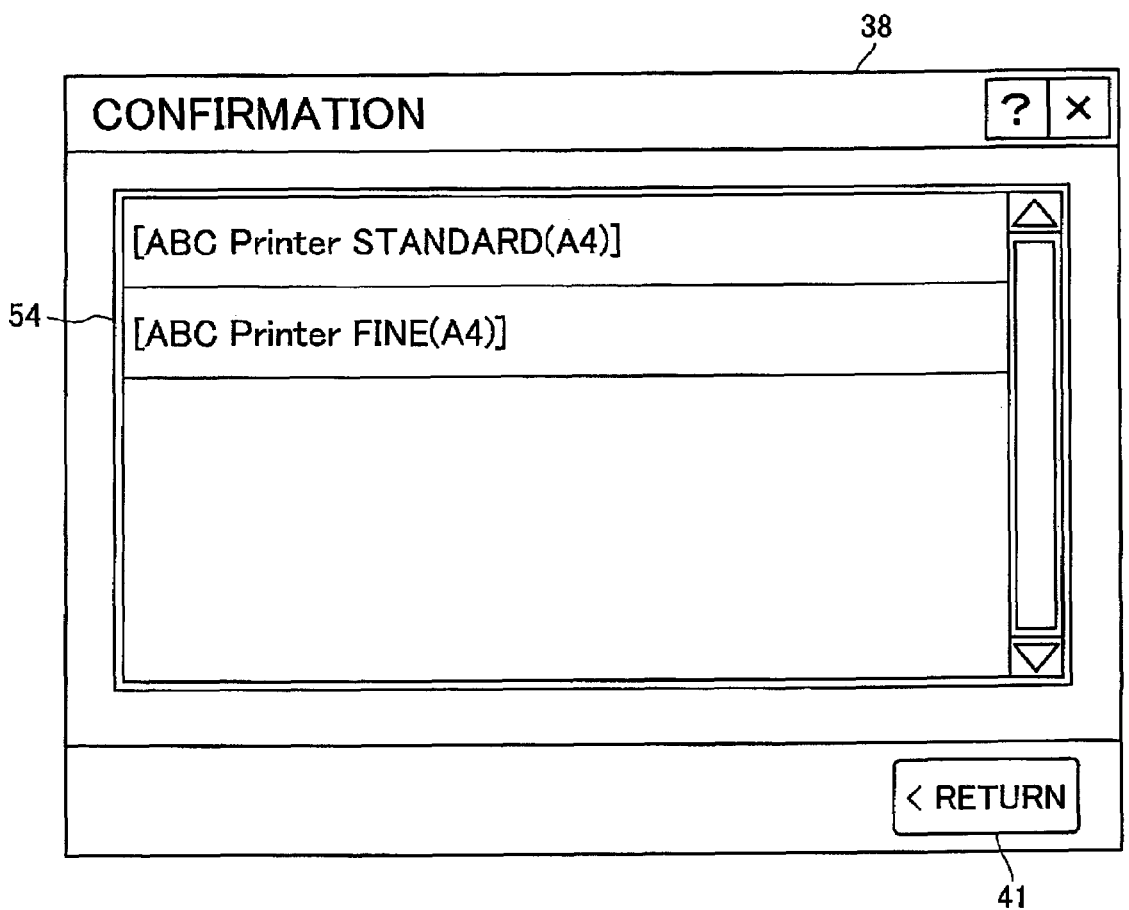
FIG. 22 is a screenshot of a Confirmation window.

When the CPU 11 determines that all virtual printers have been added to the registry (S11: YES), in S12 the CPU 11 displays an Additional Printer Setup Complete window 37 shown in FIG. 21. The Additional Printer Setup Complete window 37 notifies the user that the additional virtual printers have been registered. The Additional Printer Setup Complete window 37 displays a prescribed notification and includes the End button 44, as in the Standard Driver Setup Complete window 35. However, unlike the Standard Driver Setup Complete window 35, the Additional Printer Setup Complete window 37 also includes a Confirmation button 47. Clicking the Confirmation button 47 displays a Confirmation window 38 (see FIG. 22) on the display unit 15, enabling the user to visually confirm the existence and type of virtual printers that have been installed on the personal computer 1.

In S13 of FIG. 11, the CPU 11 determines whether an end installation signal has been inputted in the Additional Printer Setup Complete window 37 based on whether the user has clicked the End button 44, for example. If the CPU 11 determines that an end installation command has been inputted, then the series of installation processes ends. However, if an end installation command has not been inputted (S13: NO), but in S14 the CPU 11 determines that the user has clicked on the Next button 39 (S14: YES), then the process is repeated from S6. However, if the CPU 11 determines that the Next button 39 was not clicked (S14: NO), but that the Confirmation button 47 was clicked (S15: YES), then in S16 the CPU 11 displays a list of the virtual printers registered in the registry on the display unit 15. The list of virtual printers is displayed in cooperation with the OS file system. Here, it is also possible to display a popup window of the primary settings for the virtual printers when the user moves the mouse pointer over the virtual printer names in the Confirmation window 38. Further, the Confirmation window 38 may be provided with a Delete button for deleting from the personal computer 1 virtual printers that the user selects in the Confirmation window 38.

Since the Printer Selection window 36 shown in FIG. 18 is displayed to enable the user to select an arbitrary virtual printer when registering an additional virtual printer, the user can readily perceive the printing conditions of virtual printers from the displayed virtual printer names. Hence, the user can determine which virtual printers are necessary and which are unnecessary and can register only desired virtual printers on the personal computer 1. That is, the user can select which of the virtual printers to add. Accordingly, a user-friendly interface is provided for specifying identification data.

While the invention has been described in detail with reference to the above aspects thereof, it would be apparent to those skilled in the art that various changes and modifications may be made therein without departing from the spirit of the invention.

While this example described above gives a process for installing a standard driver from the CD-ROM 70, the invention is not limited to this process. For example, by storing the printer driver 71 and installer 75 in the system folder of the hard disk drive 14 in advance, the standard driver can be installed from the hard disk drive 14 and additional virtual printers can also be registered from the hard disk drive 14. It is also possible that the installer is stored on the hard disk drive 14 and the printer driver is stored on a CD-ROM. As a result, when actually printing or scanning an image, the user can specify a desired virtual object for implementing the printing process or image-scanning process from among virtual objects selected by the users themselves.

Further, in the above example, the standard driver is installed on the personal computer 1 prior to registering additional virtual printers. However, it is also possible to select the "ABC Printer: Normal (A4)" in the Printer Selection window 36 shown in FIG. 18 and to install the standard driver when registering the selected virtual printer.

Figure 23:
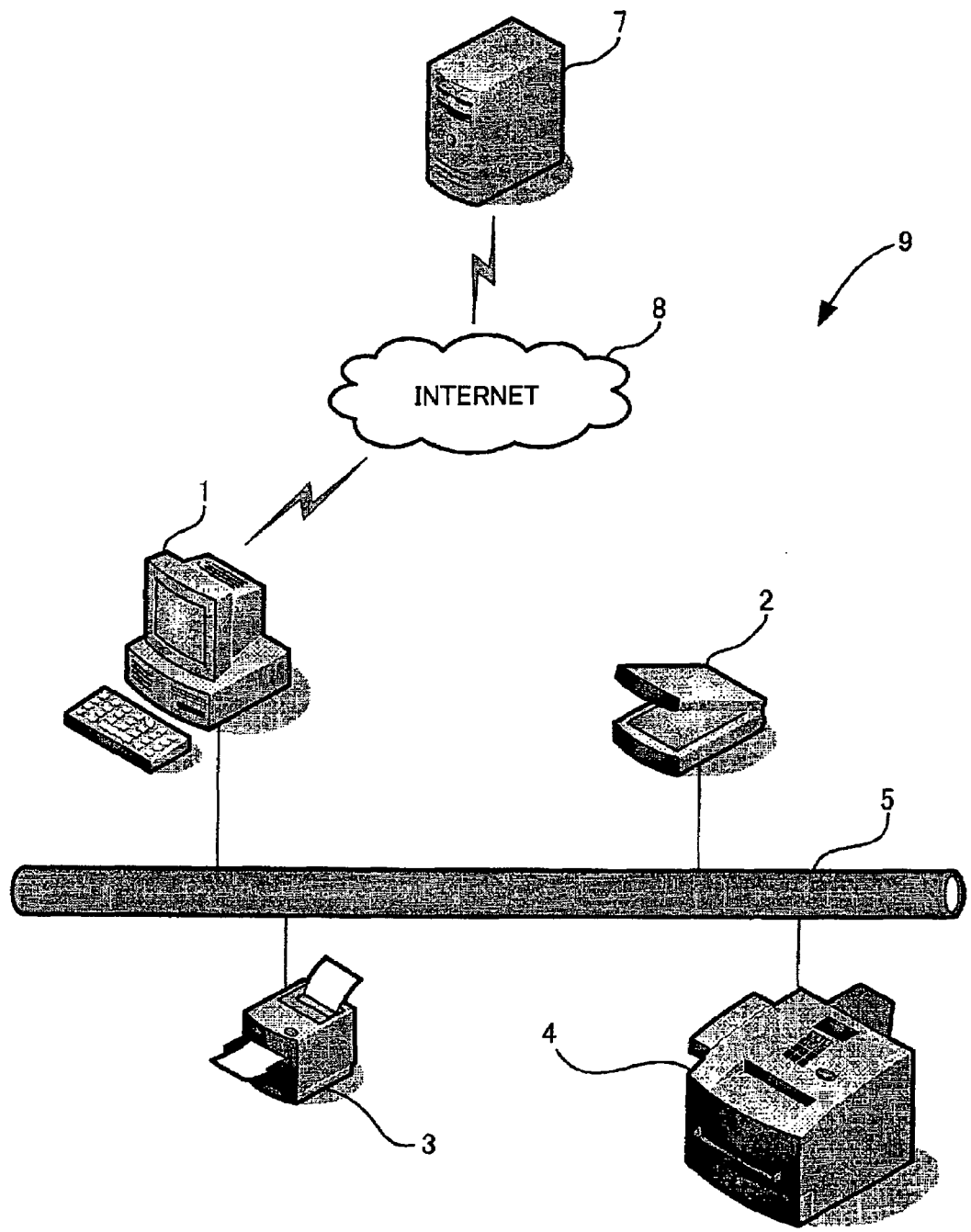
FIG. 23 is an explanatory diagram illustrating a variation of the network environment in which the personal computer is connected to a scanner, printer, and multifunction device.

The invention may also be applied to a network system 9 shown in FIG. 23. In the network system 9, printer drivers are distributed over an internet 8 or LAN from a server 7 connected to the internet 8. In this example, the server 7 is provided with a fixed hard disk drive for storing and managing the printer driver 71. In this system, the process for installing the printer driver distributed from the server 7 is identical to that in the example described above.

It should be apparent that the invention is not limited to the methods of installation described above, but may be applied to other installation methods.

Further, the invention may be applied to an installation process executed when a main driver body exists for each virtual printer.

What is claimed is:

1. A data processing device capable of registering a single prescribed peripheral device as a plurality of virtual peripheral devices, the data processing device comprising:
    an identification information displaying controller that displays a plurality of identification information each of which indicates a corresponding one of the plurality of virtual peripheral devices having a corresponding operating condition;
    a selecting controller that selects at least one of the plurality of virtual peripheral devices by selecting at least one of the plurality of identification information from the plurality of identification information displayed by the identification information displaying controller;
    an installing controller that installs said at least one of the plurality of virtual peripheral devices selected by the selecting controller; and
    an operation instructing controller that instructs the single prescribed peripheral device to operate as the installed one of the plurality of virtual peripheral devices having a corresponding operation condition.

2. The data processing device as claimed in claim 1, wherein the plurality of identification information is stored in a storage medium provided externally to the data processing device.

3. The data processing device as claimed in claim 1, wherein the plurality of identification information is stored in a storage medium provided in a data storage device connected externally to the data processing device, the data storage device being capable of communicating with the data processing device via a prescribed communication network.

4. The data processing device as claimed in claim 1, wherein the plurality of identification information is displayed in a specification window on a display device.

5. The data processing device as claimed in claim 1, wherein each of the plurality of identification information includes outline information.

6. The data processing device as claimed in claim 1, wherein each of the plurality of identification information includes at least one operating condition value.

7. The data processing device as claimed in claim 6, wherein said at least one operating condition value is predetermined.

8. The data processing device as claimed in claim 6, wherein said at least one operating condition value is displayed by one of a dialog box and a popup window.

9. The data processing device as claimed in claim 1, wherein the single prescribed peripheral device comprises at least one of an image-scanning device and an image-recording device.

10. A method for registering a single prescribed peripheral device as a plurality of virtual peripheral devices on a data processing device, the method comprising steps of:
    displaying, on a display device, a plurality of identification information each of which indicates a corresponding one of the plurality of virtual peripheral devices having a corresponding operating condition;
    selecting at least one of the plurality of virtual peripheral devices by selecting at least one of the plurality of identification information from the plurality of identification information displayed in the displaying step;
    installing said at least one of the plurality of virtual peripheral devices selected in the selecting step; and
    instructing the single prescribed peripheral device to operate as the installed one of the plurality of virtual peripheral devices having a corresponding operation condition.

11. A computer readable storage medium storing a set of program instructions executable by a computer of a data processing device, the program instructions registering a single prescribed peripheral device as a plurality of virtual peripheral devices on a data processing device, the program instructions comprising:
    instructions for displaying, on a display device, a plurality of identification information each of which indicates a corresponding one of the plurality of virtual peripheral devices having a corresponding operating condition;
    instructions for selecting at least one of the plurality of virtual peripheral devices by selecting at least one of the plurality of identification information from the plurality of identification information displayed by the instructions for displaying;
    instructions for installing said at least one of the plurality of virtual peripheral devices selected by the instructions for selecting; and instructions for instructing the single prescribed peripheral device to operate as the installed one of the plurality of virtual peripheral devices having a corresponding operation condition.

12. The computer readable storage medium as claimed in claim 11, wherein the storage medium further stores the plurality of identification information.

13. The computer readable storage medium as claimed in claim 11, wherein the plurality of identification information is displayed in a specification window on the display device by the instructions for displaying.

14. The computer readable storage medium as claimed in claim 11, wherein each of the plurality of identification information includes outline information.

15. The computer readable storage medium as claimed in claim 11, wherein each of the plurality of identification information includes at least one operating condition value.

16. The computer readable storage medium as claimed in claim 15, wherein said at least one operating condition value is predetermined.

17. The computer readable storage medium as claimed in claim 15, wherein said at least one operating condition value is displayed by one of a dialog box and a popup window by instructions for displaying.

18. The computer readable storage medium as claimed in claim 11, wherein the single prescribed peripheral device comprises at least one of an image-scanning device and an image-recording device.

* * * * *